(12) United States Patent
Maruiwa

(10) Patent No.: US 11,189,170 B2
(45) Date of Patent: Nov. 30, 2021

(54) AUTOMATED PARKING SYSTEM AND SERVER

(71) Applicant: Toyota Jidosha Kabushiki Kaisha, Toyota (JP)

(72) Inventor: Nobutsugu Maruiwa, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/989,334

(22) Filed: Aug. 10, 2020

(65) Prior Publication Data
US 2021/0110714 A1    Apr. 15, 2021

(30) Foreign Application Priority Data

Oct. 11, 2019   (JP) .............................. JP2019-187893

(51) Int. Cl.
| | |
|---|---|
| *G06Q 10/02* | (2012.01) |
| *G07C 5/08* | (2006.01) |
| *G07C 9/27* | (2020.01) |
| *G06Q 50/30* | (2012.01) |
| *B60W 30/06* | (2006.01) |
| *G08G 1/14* | (2006.01) |

(52) U.S. Cl.
CPC ............. *G08G 1/149* (2013.01); *G06Q 10/02* (2013.01)

(58) Field of Classification Search
CPC .................................................... G08B 1/149
See application file for complete search history.

(56) References Cited

U.S. PATENT DOCUMENTS

| | | | | |
|---|---|---|---|---|
| 8,610,597 | B2 * | 12/2013 | Stefik ..................... | G08G 1/148 340/932.2 |
| 9,701,305 | B2 * | 7/2017 | Paul ...................... | B60W 10/04 |

(Continued)

FOREIGN PATENT DOCUMENTS

| | | |
|---|---|---|
| CA | 3078655 A1 | 3/2019 |
| JP | 2018-041381 A | 3/2018 |

(Continued)

OTHER PUBLICATIONS

U.S. Appl. No. 16/889,250, filed Jun. 1, 2020, Inventor(s): Tatsuya Sugano.

*Primary Examiner* — Emily C Terrell
*Assistant Examiner* — Pameshanand Mahase
(74) *Attorney, Agent, or Firm* — Dinsmore & Shohl LLP

(57) ABSTRACT

A server includes a vehicle determination unit, an hour determination unit, and an authentication code transmission unit. The vehicle determination unit is configured to determine whether a reservation object vehicle corresponding to reservation vehicle information is in a parking place object area preset based on detection information of a parking place sensor and the reservation vehicle information. The hour determination unit is configured to determine whether a current hour is equal to or later than a transmission start hour. The authentication code transmission unit is configured to transmit an authentication code to a user terminal of a reservation user, when the vehicle determination unit determines that the reservation object vehicle is in the parking place object area and the hour determination unit determines that the current hour is equal to or later than the transmission start hour.

6 Claims, 10 Drawing Sheets

(56) References Cited

U.S. PATENT DOCUMENTS

| | | | |
|---|---|---|---|
| 2011/0022425 A1* | 1/2011 | Block | G06Q 10/02 705/5 |
| 2016/0133133 A1 | 5/2016 | Triplett | |
| 2017/0144654 A1* | 5/2017 | Sham | G05D 1/0088 |

FOREIGN PATENT DOCUMENTS

| | | |
|---|---|---|
| JP | 2018-190215 A | 11/2018 |
| JP | 2019-168408 | 10/2019 |

* cited by examiner

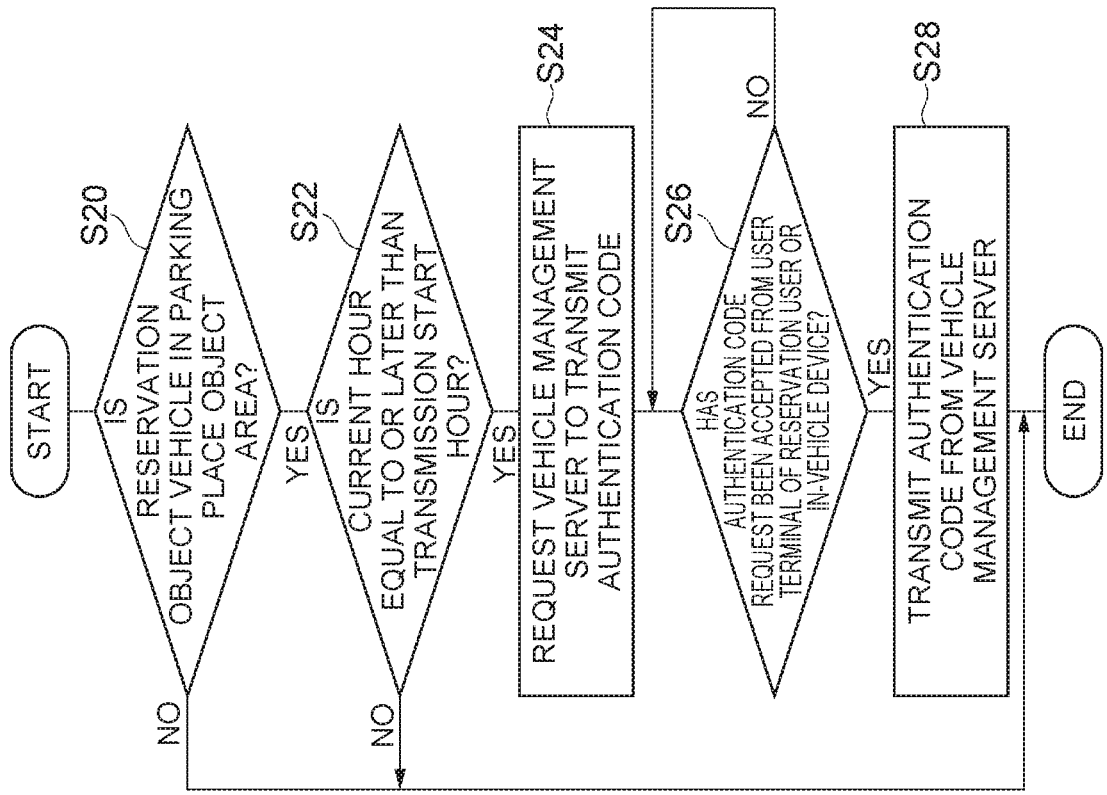
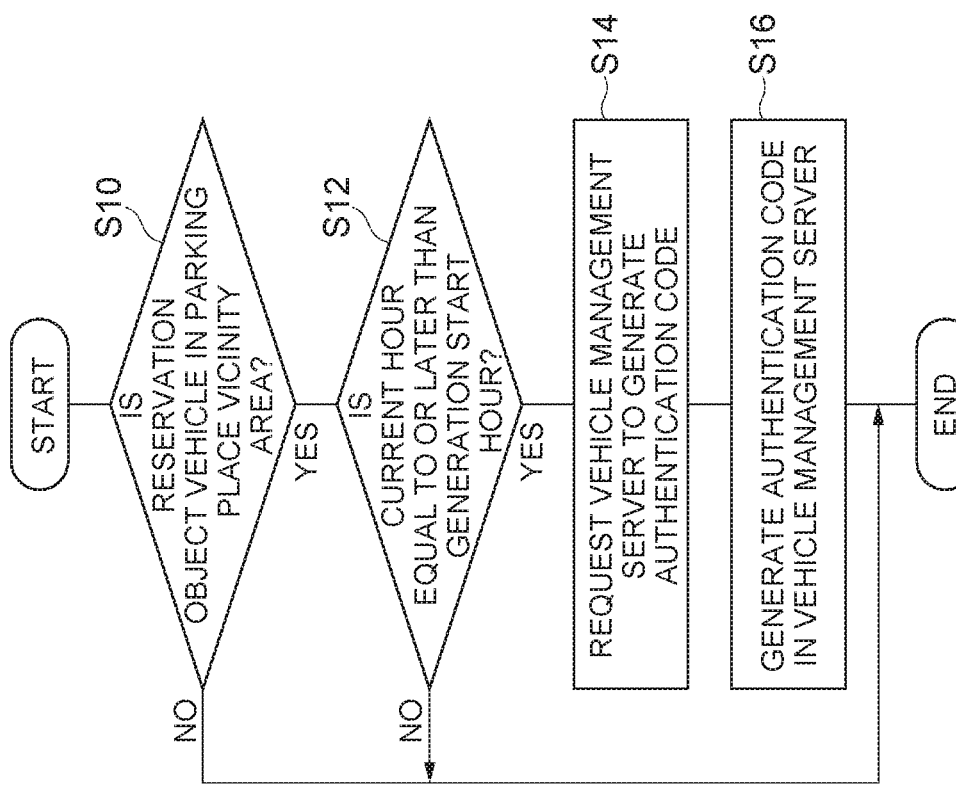

AUTOMATED PARKING SYSTEM AND SERVER

INCORPORATION BY REFERENCE

The disclosure of Japanese Patent Application No. 2019-187893 filed on Oct. 11, 2019 including the specification, drawings and abstract is incorporated herein by reference in its entirety.

BACKGROUND

1. Technical Field

The disclosure relates to an automated parking system and a server.

2. Description of Related Art

Japanese Patent Application Publication No. 2018-041381 is known as a technical literature relevant to an automated parking system. In a valet parking system described in the technical literature, when a valet parking application is transmitted from a terminal device of a user of an automated driving vehicle to a server on a parking place facility side, a temporary key request is transmitted from the server to the terminal device. When it is determined that the temporary key request is true, a temporary key for the automated driving vehicle is transmitted from the terminal device to the server. Thereafter, in the valet parking system, the server transmits a driving plan to the automated driving vehicle, together with the temporary key, and thereby, a valet parking with automated driving is executed.

SUMMARY

In the above-described valet parking system, when it is determined that the temporary key request is true after the valet parking application, the temporary key is transmitted. Therefore, for example, even when the automated driving vehicle is distant from the parking place, the temporary key can be transmitted. It is undesirable that the temporary key or other data related to an operation authority for the automated driving vehicle is transmitted at an excessively early timing, and there is a room for improvement from a standpoint of security.

The disclosure provides a technology for enhancing the security relevant to transmission of an authentication code.

A first aspect of the disclosure is an automated parking system. The automated parking system includes a server. The server is configured to start an instruction of an automated valet parking for an automated driving vehicle of a reservation user in a parking place, when the server transmits an authentication code to a reservation user of an entering reservation including a scheduled entering hour and reservation vehicle information, after accepting the entering reservation, and a check-in using the authentication code is performed in the parking place after the transmission of the authentication code. The server includes a vehicle determination unit, an hour determination unit, and an authentication code transmission unit. The vehicle determination unit is configured to determine whether a reservation object vehicle is in a parking place object area preset based on detection information of a parking place sensor provided in the parking place and the reservation vehicle information or based on position information that is transmitted from the reservation object vehicle, the reservation object vehicle being the automated driving vehicle that corresponds to the reservation vehicle information. The hour determination unit is configured to determine whether a current hour is equal to or later than a transmission start hour. The transmission start hour is earlier than a preset transmission setting time based on the scheduled entering hour. The authentication code transmission unit is configured to transmit the authentication code to a user terminal of the reservation user or an in-vehicle device of the reservation object vehicle, when the vehicle determination unit determines that the reservation object vehicle is in the parking place object area and the hour determination unit determines that the current hour is equal to or later than the transmission start hour.

With the first aspect, the authentication code is transmitted in the case where it is determined that the reservation object vehicle is in the parking place object area and where it is determined that the current hour is equal to or later than the transmission start hour that is earlier than the scheduled entering hour by the transmission setting time. Therefore, it is possible to avoid the authentication code from being transmitted at a timing when the reservation object vehicle is distant from the parking place or a timing that is excessively earlier than the scheduled entering hour, and to enhance the security relevant to transmission of the authentication code, compared to a case where the relation of the position of the reservation object vehicle, the current hour and the scheduled entering hour is not considered.

In the first aspect, the server may include an authentication code generation unit configured to generate the authentication code, when the vehicle determination unit determines that the reservation object vehicle is in the parking place object area and the hour determination unit determines that the current hour is equal to or later than the transmission start hour.

With the above configuration, the authentication code is generated in the case where it is determined that the reservation object vehicle is in the parking place object area and where it is determined that the current hour is equal to or later than the transmission start hour that is earlier than the scheduled entering hour by the transmission setting time. Therefore, it is possible to avoid the authentication code from being generated at the timing when the reservation object vehicle is distant from the parking place or the timing that is excessively earlier than the scheduled entering hour, compared to the case where the relation of the position of the reservation object vehicle, the current hour and the scheduled entering hour is not considered. Accordingly, with the automated parking system, it is possible to shorten a time during which the authentication code exists, and therefore, it is possible to enhance the security relevant to the authentication code.

In the first aspect, the server may include an authentication code generation unit configured to generate the authentication code. The vehicle determination unit may be configured to determine whether the reservation object vehicle is in a parking place vicinity area preset based on the position information that is transmitted from the reservation object vehicle. The hour determination unit may be configured to determine whether the current hour is equal to or later than a generation start hour. The generation start hour may be earlier than a preset generation setting time based on the scheduled entering hour. The authentication code generation unit may be configured to generate the authentication code, when the vehicle determination unit determines that the reservation object vehicle is in the parking place vicinity area and the hour determination unit determines that the current hour is equal to or later than the generation start hour.

The parking place vicinity area may be an area that extends to the outside of an entrance of the parking place compared to the parking place object area. The generation start hour may be an hour equal to the transmission start hour or an hour earlier than the transmission start hour.

With the above configuration, the authentication code is generated in the case where it is determined that the reservation object vehicle is in the parking place vicinity area that extends to the outside of the entrance of the parking place compared to the parking place object area and where the current hour is equal to or later than the generation start hour that is earlier than the scheduled entering hour by the generation setting time. Therefore, while enhancing the security in consideration of the relation of the position of the reservation object vehicle, the current hour and the scheduled entering hour, it is possible to generate and prepare the authentication code before the condition for the transmission of the authentication code is satisfied, and it is possible to distribute computation load on the server compared to a case where the generation and the transmission are concurrently performed.

In the first aspect, the server may include a user request acceptance unit configured to accept an authentication code request from the user terminal or the in-vehicle device. The authentication code transmission unit may be configured to transmit the authentication code after the user request acceptance unit accepts the authentication code request, when the vehicle determination unit determines that the reservation object vehicle is in the parking place object area and the hour determination unit determines that the current hour is equal to or later than the transmission start hour.

With the above configuration, the authentication code is transmitted after the acceptance of the authentication code request from the user terminal or the in-vehicle device. Therefore, it is possible to shorten a time from the transmission of the authentication code to the check-in using the authentication code, and to contribute to the enhancement of the security relevant to the authentication code, compared to a case where the authentication code is transmitted before user's preparation is completed.

In the first aspect, the server may be a parking place management server configured to manage the parking place and a vehicle management server configured to manage the automated driving vehicle, the parking place management server may include the vehicle determination unit and the hour determination unit, and the vehicle management server may include the authentication code transmission unit.

With the above configuration, roles are divided and shared by the parking place management server that manages the parking place and the vehicle management server that manages the automated driving vehicle. Thereby, it is possible to perform security measures corresponding the respective roles, and there is an advantage in the enhancement of the security relevant to the authentication code.

A second aspect of the disclosure is a server. The server includes a vehicle determination unit, an hour determination unit, and an authentication code transmission unit.

The server is configured to start an instruction of an automated valet parking for an automated driving vehicle of a reservation user in a parking place, when the server transmits an authentication code to the reservation user of an entering reservation including a scheduled entering hour and reservation vehicle information, after accepting the entering reservation, and a check-in using the authentication code is performed in the parking place after the transmission of the authentication code. The vehicle determination unit is configured to determine whether a reservation object vehicle is in a parking place object area preset based on detection information of a parking place sensor provided in the parking place and the reservation vehicle information or based on position information that is transmitted from the reservation object vehicle, the reservation object vehicle being the automated driving vehicle that corresponds to the reservation vehicle information. The hour determination unit is configured to determine whether a current hour is equal to or later than a transmission start hour. The transmission start hour is earlier than a preset transmission setting time based on the scheduled entering hour. The authentication code transmission unit is configured to transmit the authentication code to a user terminal of the reservation user or an in-vehicle device of the reservation object vehicle, when the vehicle determination unit determines that the reservation object vehicle is in the parking place object area and the hour determination unit determines that the current hour is equal to or later than the transmission start hour.

With the second aspect, the authentication code is transmitted in the case where it is determined that the reservation object vehicle is in the parking place object area and where it is determined that the current hour is equal to or later than the transmission start hour that is earlier than the scheduled entering hour by the transmission setting time. Therefore, it is possible to avoid the authentication code from being transmitted at the timing when the reservation object vehicle is distant from the parking place or the timing that is excessively earlier than the scheduled entering hour, and to enhance the security relevant to the transmission of the authentication code, compared to the case where the relation of the position of the reservation object vehicle, the current hour and the scheduled entering hour is not considered.

With the first aspect and second aspect of the disclosure, it is possible to enhance the security relevant to the transmission of the authentication code.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6A is a flowchart showing an example of an authentication code generation process;

FIG. 6B is a flowchart showing an example of an authentication code transmission process;

DETAILED DESCRIPTION OF EMBODIMENTS

Embodiments of the disclosure will be described below with reference to the drawings.

Figure 1:
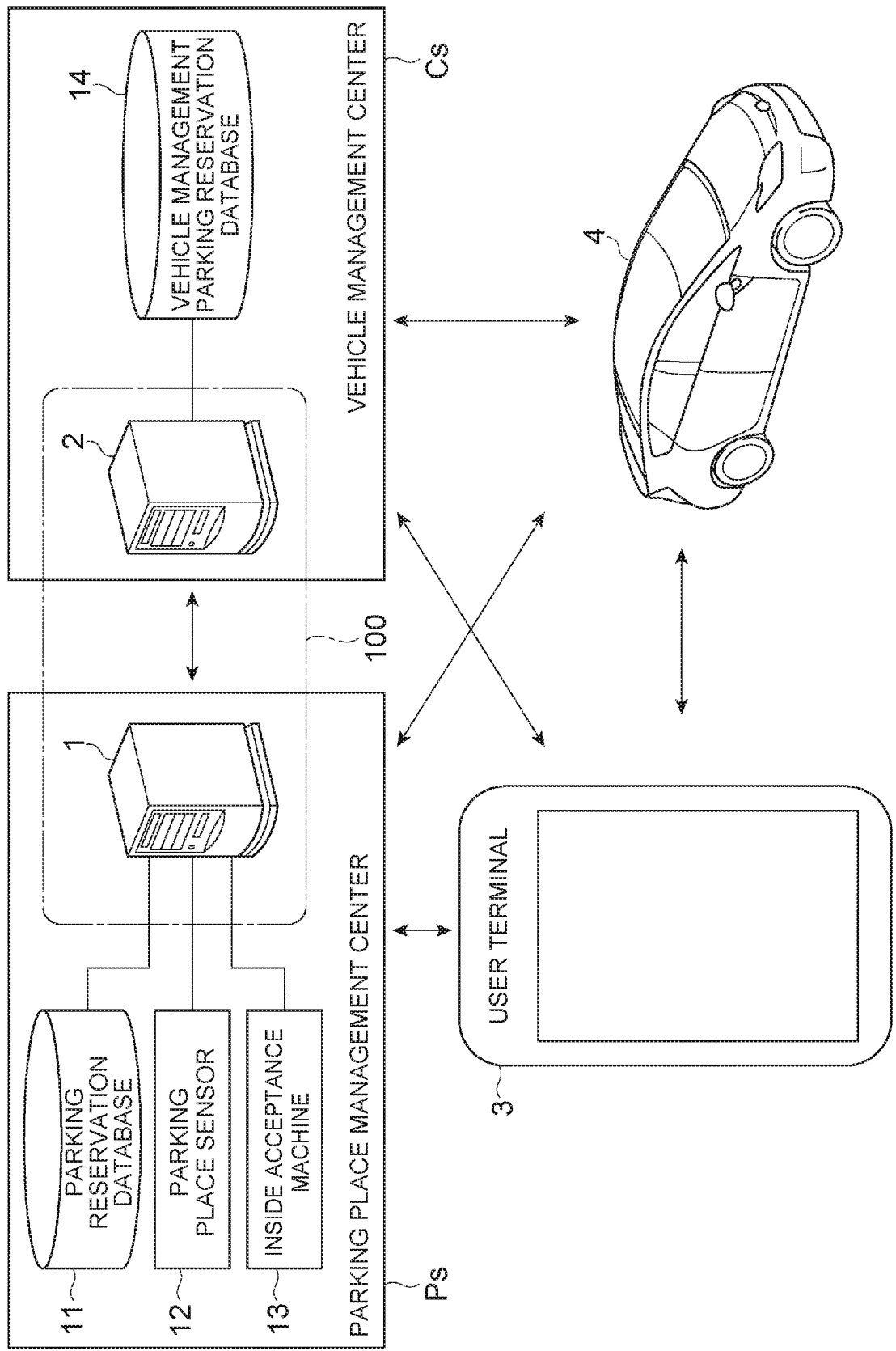
FIG. 1 is an explanatory diagram of an automated valet parking including an automated parking system according to an embodiment.

FIG. 1 is an explanatory diagram of an automated valet parking including an automated parking system according to an embodiment. An automated parking system (AVPS: Automated Valet Parking System) 100 shown in FIG. 1 is a system for performing an automated valet parking in a parking place.

The automated valet parking is a service by which an unmanned automated driving vehicle after drop-off of a user (occupant) in a drop-off area within the parking place travels along a target route due to an instruction from the parking place side (the automated parking system 100 side) and automatically parks at a target parking space in the parking place. The target parking space is a parking space that is preset as a parking position for the automated driving vehicle. The target route is a route in the parking place along which the automated driving vehicle travels for arriving at the target parking space. At the time of leaving, the target route is a route along which the automated driving vehicle travels for arriving at a pick-up space described later.

In the automated valet parking, an entering reservation is performed. The entering reservation is a reservation for an entering into the parking place in which the automated valet parking is performed. The entering reservation also means a reservation for becoming an object of the automated valet parking. The entering reservation includes a scheduled entering hour, reservation vehicle information and reservation user information. The entering reservation may include a scheduled leaving hour. The entering reservation will be described later in detail. Hereinafter, the user as an object of the entering reservation is referred to as a reservation user.

In the automated valet parking, a vehicle operation authority for the automated driving vehicle is given to the automated parking system 100. A process of giving the vehicle operation authority for the automated driving vehicle to the automated parking system 100 is referred to as a check-in. In the check-in, it is necessary to use an authentication code that the reservation user having performed the entering reservation can request. The authentication code is a code to be used for confirming whether the reservation user having performed the entering reservation and the automated driving vehicle as the object of the entering reservation are identical to the user and the automated driving vehicle that attempt to receive the service of the automated valet parking in the parking place.

The format of the authentication code is not particularly limited as long as the identity can be confirmed. The authentication code may be a two-dimensional code such as a Quick Response (QR) code (QR code is a registered mark), may be a number, or may be a password including a character, a sign or a number. The authentication code may be a pattern display that dynamically changes with time, or may be another encryption code.

The authentication code may be transmitted in an encrypted state, and may be used after the encrypted authentication code is decrypted by a decryption function that is previously installed in a receiving side such as a user terminal.

The number of kinds of the authentication code is not limited to one, and a plurality of kinds of authentication codes may be transmitted. The authentication code may be transmitted to each of the user terminal and an in-vehicle device (described later) of the automated driving vehicle. The authentication code transmitted to the user terminal and the authentication code transmitted to the automated driving vehicle may be the same authentication code, or may be different authentication codes. The authentication code transmitted to the user terminal may be an authentication code that can be recognized as an image, and the authentication code transmitted to the automated driving vehicle may be a number or password that can be manually input. Further, the check-in may require both the authentication code transmitted to the user terminal and the authentication code transmitted to the automated driving vehicle.

A process of terminating the grant of the vehicle operation authority for the automated driving vehicle to the automated parking system 100 and completing the automated valet parking is referred to as a check-out. In the check-out, an authentication code for the check-out may be requested and used. The check-in and the check-out will be described later in detail.

Figure 2:
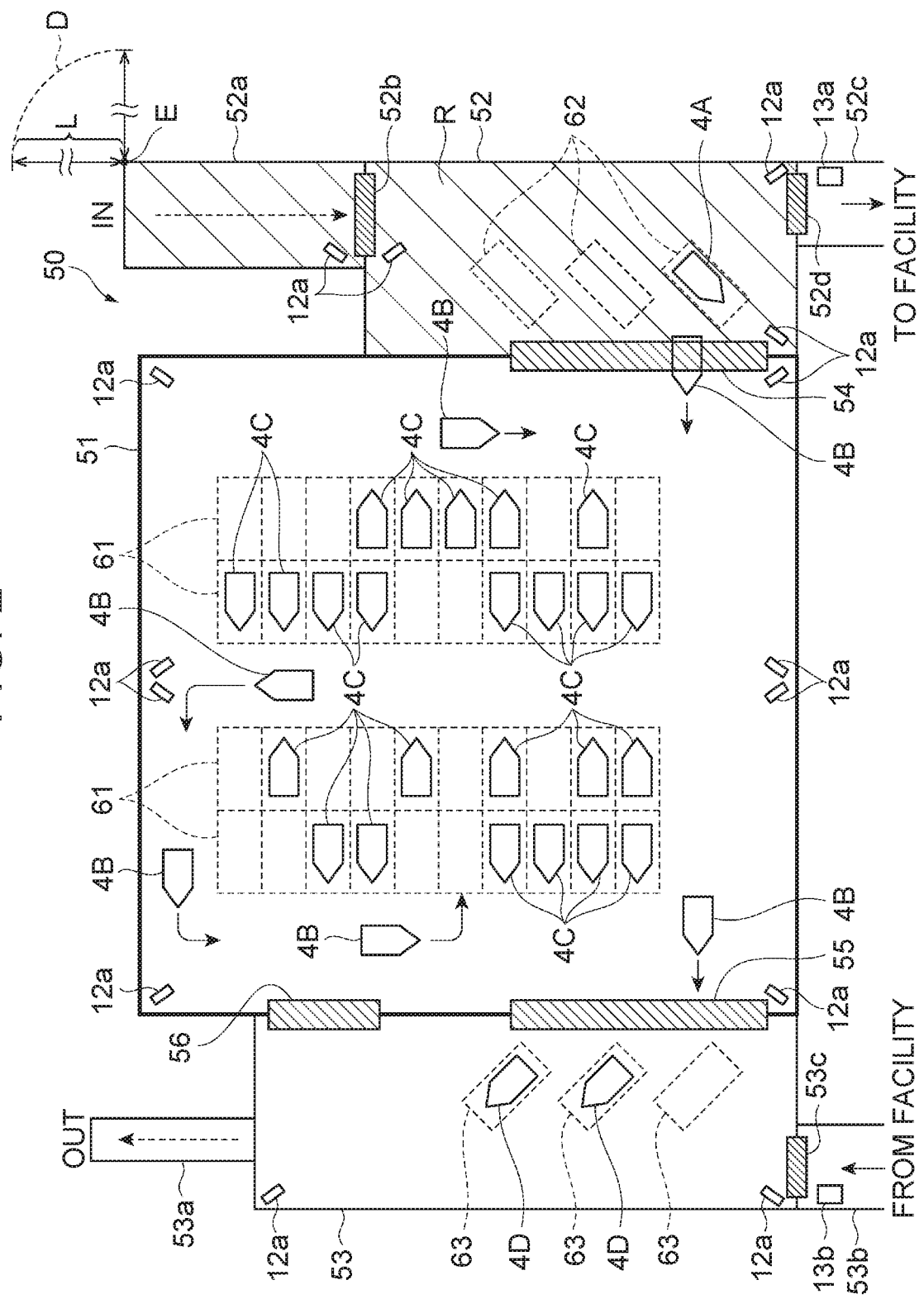
FIG. 2 is a plan view showing an example of a parking place in which the automated valet parking is performed.

FIG. 2 is a plan view showing an example of the parking place in which the automated valet parking is performed. FIG. 2 shows a parking place 50, a parking area 51, a drop-off area 52 and a pick-up area 53 that are used for the automated valet parking.

The parking place 50 is a parking place exclusively for the automated valet parking. In the parking place 50, a plurality of monitoring cameras 12a constituting a parking place sensor 12 described later is provided. The parking place 50 may serve also as a parking place for general vehicles that are not objects of the automated valet parking. Further, a part of a parking place for general vehicles may be used as an area exclusively for the automated valet parking. In the parking place 50, a parking place object area R and a parking place vicinity area D are set. The parking place object area R and the parking place vicinity area D will be described later in detail.

The parking place 50 shown in FIG. 2 includes the parking area 51, the drop-off area 52 and the pick-up area 53. The parking area 51 is an area in which parking spaces (parking boxes) 61 are formed. By the automated valet parking, an automated driving vehicle 4 parks at the parking space 61. For example, as shown in FIG. 2, a plurality of parking spaces 61 is formed so as to be arrayed in one direction (for example, in a vehicle width direction of a parked vehicle).

The drop-off area 52 is an area that is provided on an entrance side of the parking place 50 and in which the occupant including the user drops off the automated driving vehicle 4 before entering. In the drop-off area 52, drop-off spaces 62 are formed. At the time of the drop-off of the occupant, the automated driving vehicle 4 stops at the drop-off space 62. The drop-off area 52 leads to the parking area 51 through an entering gate 54.

The drop-off area 52 communicates with an entrance traveling pathway 52a, and an entrance gate 52b is provided between the drop-off area 52 and the entrance traveling pathway 52a. The entrance traveling pathway 52a is connected to a general road or the like outside the parking place 50. The entrance traveling pathway 52a is a traveling pathway through which the automated driving vehicle 4 passes for entering the parking place 50. The entrance gate 52b is a gate for preventing a vehicle for which the automated valet parking is not performed (for example, a general vehicle that has no automated driving function) from entering the drop-off area 52.

The entrance gate 52b may be configured to permit the passing of the vehicle, when a parking place management server 1 recognizes a vehicle number on a number plate of the vehicle traveling on the entrance traveling pathway 52a, from a photographed image of the monitoring camera, and can confirm that the vehicle is an object of the entering reservation for the parking place 50. The entrance gate 52b may be configured to permit the passing of the vehicle, when the content (for example, an entering reservation number) of the entering reservation input by the user to an acceptance machine that is provided in front of the entrance gate 52b coincides with the content of the entering reservation stored in the parking place management server 1. The input of the content of the entering reservation may be performed from the user terminal or the like, by short-distance communication. As the short-distance communication, for example, Bluetooth Low Energy (BLE) (Bluetooth is a registered mark) or Near Field Communication (NFC) can be used.

The drop-off area 52 communicates with a facility entrance passage 52c through which the user having dropped off the automated driving vehicle 4 enters a facility such as a commercial facility. An entrance automatic door 52d is provided between the drop-off area 52 and the facility entrance passage 52c. The facility entrance passage 52c is a passage through which the user enters the facility from the parking place 50. On the facility entrance passage 52c, a check-in acceptance machine 13a is disposed. With the check-in acceptance machine 13a, the user performs the check-in for starting the automated valet parking.

The pick-up area 53 is an area that is provided on an exit side of the parking place 50 and in which the automated driving vehicle 4 after leaving is picked up by the occupant. In the pick-up area 53, pick-up spaces 63 are formed. At the pick-up space 63, the automated driving vehicle 4 waits for the pick-up by the occupant. The pick-up area 53 leads to the parking area 51 through a leaving gate 55. A return gate 56 through which the automated driving vehicle 4 returns from the pick-up area 53 to the parking area 51 is provided between the pick-up area 53 and the parking area 51. The return gate 56 is not essential.

The pick-up area 53 is connected to an exit traveling pathway 53a. The exit traveling pathway 53a is a traveling pathway through which the automated driving vehicle 4 picked up by the user in the pick-up area 53 exits to the outside of the parking place 50. An exit gate may be provided between the pick-up area 53 and the exit traveling pathway 53a.

The pick-up area 53 communicates with a facility exit passage 53b through which the user passes for returning to the parking place 50 from the facility such as a commercial facility. An exit automatic door 53c is provided between the pick-up area 53 and the facility exit passage 53b. The facility exit passage 53b is a passage through which the user enters the parking place 50 from the facility. On the facility exit passage 53b, a check-out acceptance machine 13b is disposed. With the check-out acceptance machine 13b, the user performs the check-out for getting in the automated driving vehicle 4 and getting out of the parking place 50. The check-out is a process for terminating the grant of the vehicle operation authority to the parking place management server 1 and completing the automated valet parking. The check-out will be described later in detail.

The drop-off area 52 and the pick-up area 53 do not need to be separately provided, and may be provided as a single drop-off and pick-up area. In this case, the check-in acceptance machine 13a and the check-out acceptance machine 13b do not need to be separately provided, and may be provided as a single inside acceptance machine 13.

FIG. 2 illustrates an automated driving vehicle 4A that has been stopped at a drop-off space 62 in the drop-off area 52, automated driving vehicles 4B that are traveling in the parking place 50, automated driving vehicles 4C that have been parked at parking spaces 61 in the parking area 51, and automated driving vehicles 4D that have been stopped at pick-up spaces 63 in the pick-up area 53.

In the automated parking system 100, for example, the automated driving vehicle 4 enters the parking place 50, and the occupant drops off the automated driving vehicle 4 at the drop-off space 62 (corresponding to the automated driving vehicle 4A). Then, the automated parking system 100 obtains an instruction authority for the automated driving vehicle 4, and starts the automated valet parking. The automated parking system 100 causes the automated driving vehicle 4 to travels to the target parking space in the parking area 51 (corresponding to the automated driving vehicle 4B), and causes the automated driving vehicle 4 to park at the target parking space (corresponding to the automated driving vehicle 4C). In response to a leaving request (pick-up request), the automated parking system 100 causes the parked automated driving vehicle 4 to travel to the pick-up area 53, and causes the automated driving vehicle 4 to wait at the pick-up space 63 until the occupant arrives (corresponding to the automated driving vehicle 4D).

Configuration of Automated Parking System

An example of a configuration of the automated parking system 100 will be described below with reference to the drawings. As shown in FIG. 1, the automated parking system 100 is configured to include the parking place management server 1 and a vehicle management server 2. The parking place management server 1 is a server that manages the parking place. The vehicle management server 2 is a server that manages the automated driving vehicle. The parking place management server 1 and the vehicle management server 2 are configured to be capable of communicating with each other. The automated parking system 100 does not need to include the whole configuration of the vehicle management server 2, and only needs to include a part of the configuration that is relevant to a function for realizing the automated valet parking.

Each of the parking place management server 1 and the vehicle management server 2 is configured to be capable of communicating with a user terminal (user frontend) 3 and the automated driving vehicle 4. The parking place management server 1 may be configured to be capable of communicating with the user terminal 3 and the automated driving vehicle 4 through the vehicle management server 2, and the vehicle management server 2 may be configured to be capable of communicating with the user terminal 3 and the automated driving vehicle 4 through the parking place management server 1. The communication method is not particularly limited. For example, Long Term Evolution (LTE) can be used. The user terminal 3 is a mobile information terminal of the reservation user that has performed the entering reservation for the automated valet parking. The automated driving vehicle 4 is an automated driving vehicle that is an object of the entering reservation for the automated valet parking by the reservation user. The user terminal 3 and the automated driving vehicle 4 will be described in detail later.

Parking Place Management Server

First, the parking place management server 1 will be described. As shown in FIG. 1, for example, the parking place management server 1 included in the automated parking system 100 is provided in a parking place management center Ps near the parking place. For example, the parking place management center Ps is a part of the commercial facility including the parking place. The parking place management server 1 may be provided at a position away from the parking place. For example, the parking place management server 1 may be controlled by a private company having the parking place.

Figure 4:
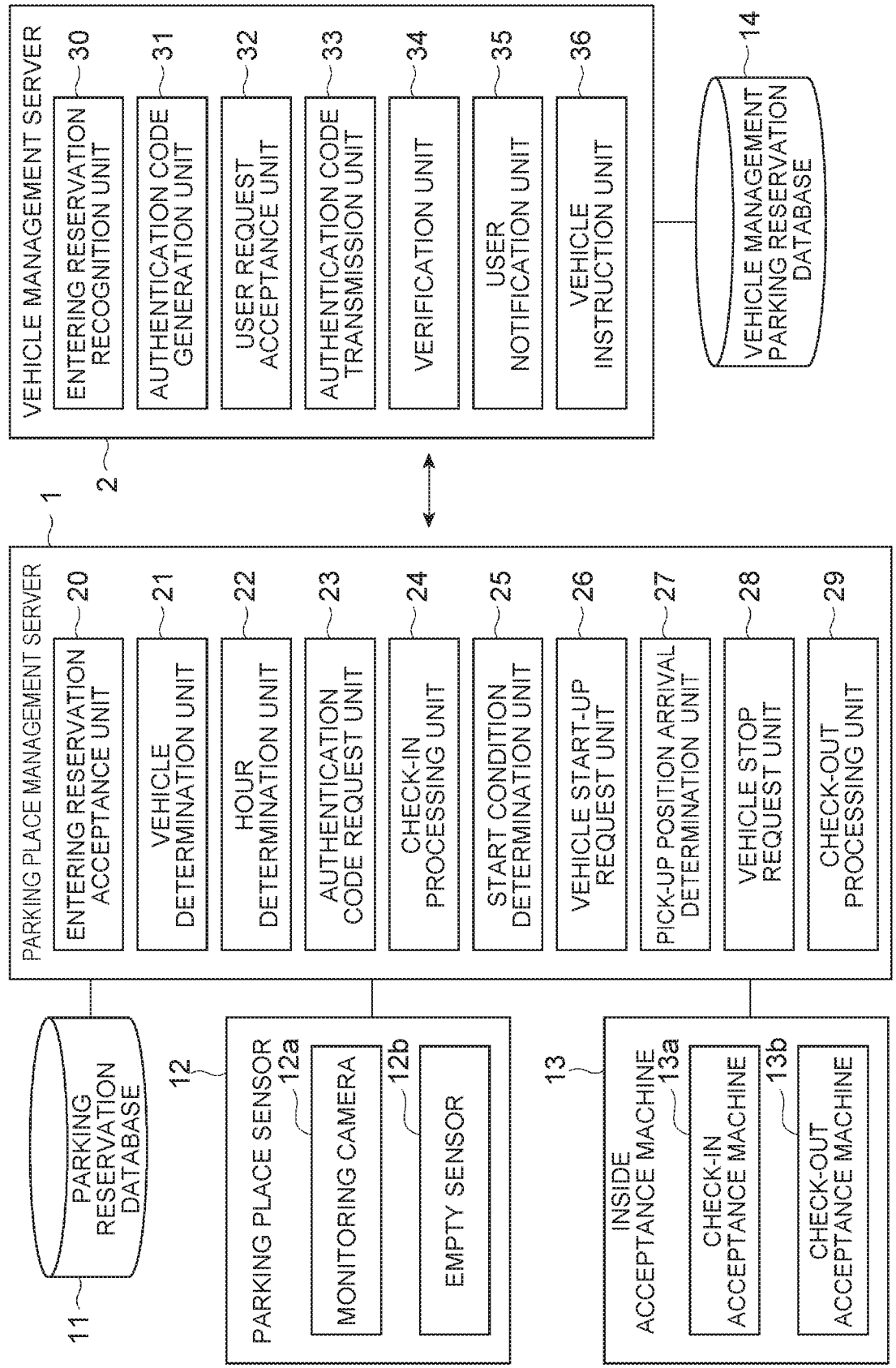
FIG. 4 is a block diagram showing an example of functional configurations of the parking place management server and a vehicle management server.

FIG. 4 is a block diagram showing an example of functional configurations of the parking place management server 1 and the vehicle management server 2. As shown in FIG. 4, the parking place management server 1 is connected to a parking reservation database 11, the parking place sensor 12 and the inside acceptance machine 13. The connection method may be a wire connection or may be a wireless connection.

The parking reservation database 11 is a database in which the entering reservation accepted by the parking place management server 1 is stored. The entering reservation includes at least the scheduled entering hour, the reservation vehicle information and the reservation user information.

The scheduled entering hour is an hour at which the automated driving vehicle of the reservation user is scheduled to enter the parking place. The reservation vehicle information is information about the automated driving vehicle that is the object of the reservation for the automated valet parking. The reservation vehicle information includes identification information for specifying the automated driving vehicle that is the object of the reservation. For example, the identification information is the vehicle number shown on the number plate of the automated driving vehicle 4. The identification information may be an identification number (ID number) that allows discrimination of each vehicle, or may be a reservation number for the automated valet parking. The identification information only needs to be information that allows the automated driving vehicle to be specified. The reservation vehicle information may include information about the type of the automated driving vehicle. The reservation vehicle information may include information about a vehicle body, as exemplified by the length, vehicle width and minimum turning radius of the automated driving vehicle. The reservation vehicle information may include information relevant to an automated driving function, and may include version information corresponding to a public standard of the automated driving function, for example.

The reservation user information is identification information for specifying the reservation user that is the object of the entering reservation. For example, the reservation user information includes the full name of the reservation user and contact information about the reservation user. As an example, the contact information is information for connection to the user terminal 3 of the reservation user. The parking reservation database 11 does not always need to be provided in the parking place management center Ps, and may be provided in a different spot as long as the parking reservation database 11 can communicate with the parking place management server 1.

The parking place sensor 12 is a sensor for recognizing a situation in the parking place 50. The parking place sensor 12 includes a plurality of monitoring cameras 12a that photographs the automated driving vehicle 4. The monitoring cameras 12a are provided on a ceiling and walls of the parking place, and photograph the automated driving vehicle 4 that travels. Each monitoring camera 12a transmits the photographed image to the parking place management server 1. The monitoring cameras 12a may be disposed so as to photograph the exterior of the parking place.

The parking place sensor 12 includes an empty sensor 12b that detects whether there is a parked vehicle for each parking space (whether each parking space is in use or empty). The empty sensor 12b may be provided for each parking space, or may be provided on the ceiling or the like such that one empty sensor 12b can monitor a plurality of parking spaces. The configuration of the empty sensor 12b is not particularly limited, and a well-known configuration can be employed. The empty sensor 12b may be a pressure sensor, may be a radar sensor or sonar sensor that uses an electric wave, or may be a camera. The empty sensor 12b transmits detection information about the parked vehicle at the parking space, to the parking place management server 1. The empty sensor 12b may be provided at the drop-off space 62 and the pick-up space 63.

The inside acceptance machine 13 is a machine (operation panel) that is provided in the parking place 50 and that accepts reservation user's operation relevant to the automated valet parking. The inside acceptance machine 13 in the embodiment includes the check-in acceptance machine 13a that is provided in the drop-off area 52 and the check-out acceptance machine 13b that is provided in the pick-up area 53.

The check-in acceptance machine 13a is an acceptance machine through which the reservation user performs the check-in for the automated valet parking. For example, the check-in acceptance machine 13a is provided on the facility entrance passage 52c connected to the drop-off area 52. The check-in acceptance machine 13a may be provided in the drop-off area 52. The check-in acceptance machine 13a includes an operation input unit (for example, a touch screen or a button) that is operated by the reservation user, and a display and a speaker that output information to the reservation user. The check-in acceptance machine 13a may include a camera that reads a variety of information.

The check-in is a process for granting the vehicle operation authority for the automated driving vehicle 4 to the parking place management server 1 in order to start the automated valet parking. In the check-in, it is necessary to use the authentication code described later. As an example, the reservation user starts the check-in, by performing an authentication code transmission request for the check-in using the user terminal 3 and holding the user terminal 3 over the reading camera of the check-in acceptance machine 13a while the transmitted authentication code is displayed.

The check-in acceptance machine 13a may request the reservation user to input the content of the entering reservation, for confirmation. The reservation user inputs requested information of the entering reservation content such as the full name of the reservation user, the contact information, the entering reservation number and the vehicle number. The check-in acceptance machine 13a may confirm the reservation user using an integrated circuit (IC) card, or may confirm the reservation user using photograph information of biological information about the face, the fingerprint, the retina and others.

The check-out acceptance machine 13b is an acceptance machine through which the reservation user performs the check-out for the automated valet parking. For example, the check-out acceptance machine 13b is provided on the facility exit passage 53b connected to the pick-up area 53. The check-out acceptance machine 13b may be provided in the pick-up area 53. The configuration of the check-out acceptance machine 13b may be the same as the configuration of the check-in acceptance machine 13a.

The check-out is a process for terminating the grant of the vehicle operation authority to the parking place management server 1 and completing the automated valet parking. In the check-out, it is necessary to use the authentication code for the check-out described later. As an example, the reservation user starts the check-out, by performing an authentication code transmission request for the check-out using the user terminal 3 and holding the user terminal 3 over the reading camera of the check-out acceptance machine 13b while the transmitted authentication code is displayed. The check-out acceptance machine 13b may request the reservation user to input the content of the entering reservation for confirmation, similarly to the check-in.

Figure 3:
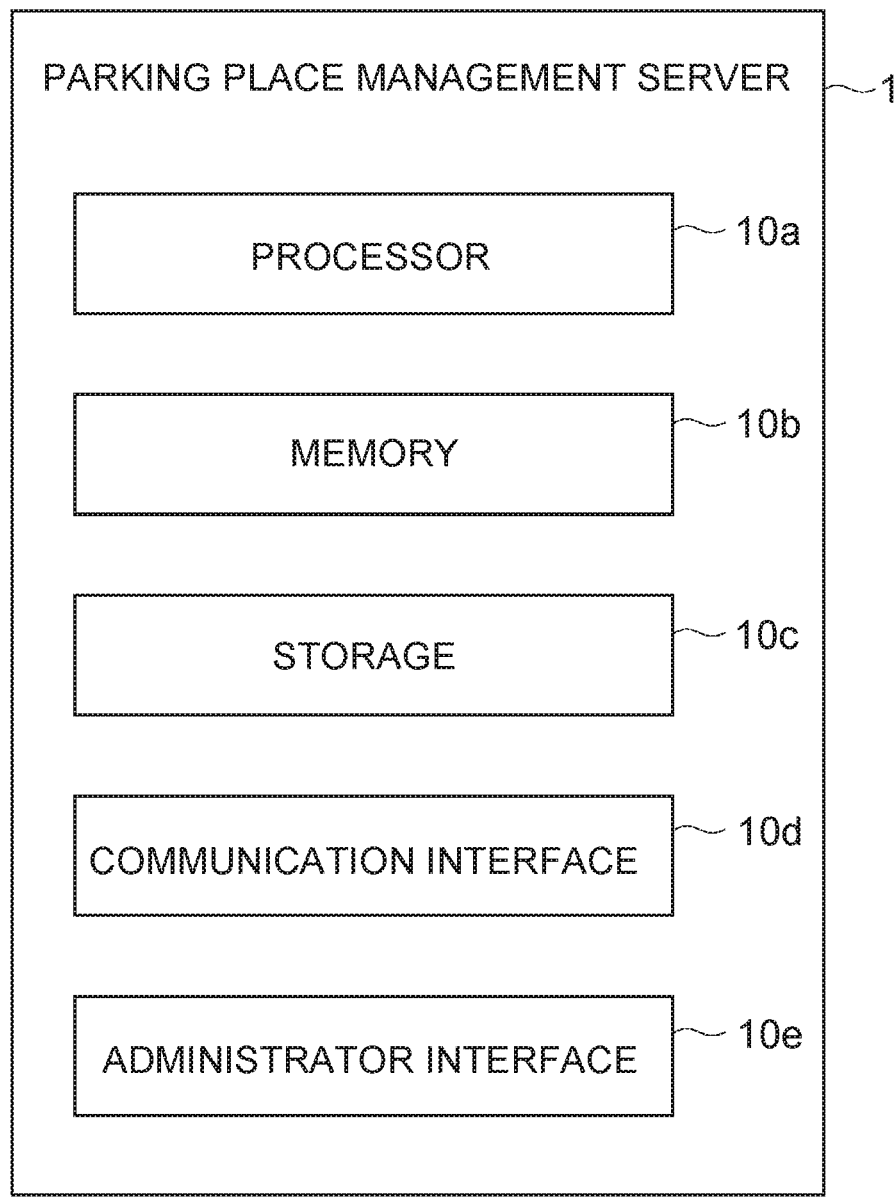
FIG. 3 is a block diagram showing an example of a hardware configuration of a parking place management server.

Next, an example of a hardware configuration of the parking place management server 1 will be described. FIG. 3 is a block diagram showing an example of the hardware configuration of the parking place management server. As shown in FIG. 3, the parking place management server 1 is configured as a general computer including a processor 10a, a memory 10b, a storage 10c, a communication interface 10d and an administrator interface 10e.

The processor 10a controls the parking place management server 1 by operating various operating systems. The processor 10a is a computation unit such as a central processing unit (CPU) that includes a control device, a computation device, a register and the like. The processor 10a integrally controls the memory 10b, the storage 10c, the communication interface 10d and the administrator interface 10e. The memory 10b is a recording medium such as a read-only memory (ROM) and a random-access memory (RAM). The storage 10c is a recording medium such as a hard disk drive (HDD).

The communication interface 10d is a communication device that performs wireless communication through a network. As the communication interface 10d, a network device, a network controller, a network card or the like can be used. The parking place management server 1 communicates with the automated driving vehicle 4 and the user terminal 3, using the communication interface 10d. The administrator interface 10e is an input-output unit of the parking place management server 1 for an administrator of the parking place management server 1 and the like. The administrator interface 10e includes an output device such as a display and a speaker, and an input device such as a touch screen. The hardware configuration of the parking place management server 1 has been described above. The vehicle management server 2 may have the same hardware configuration as the parking place management server 1.

Subsequently, an example of the functional configuration of the parking place management server 1 will be described. FIG. 4 is a block diagram showing an example of the functional configurations of the parking place management server 1 and the vehicle management server 2. As shown in FIG. 4, the parking place management server 1 includes an entering reservation acceptance unit 20, a vehicle determination unit 21, an hour determination unit 22, an authentication code request unit 23, a check-in processing unit 24, a start condition determination unit 25, a vehicle start-up request unit 26, a pick-up position arrival determination unit 27, a vehicle stop request unit 28, and a check-out processing unit 29.

The entering reservation acceptance unit 20 accepts the entering reservation. The acceptance method of the entering reservation is not particularly limited. For example, the entering reservation acceptance unit 20 accepts the entering reservation based on an application of the entering reservation from the user terminal 3. The entering reservation acceptance unit 20 may accept the entering reservation based on an application of the entering reservation from the in-vehicle device of the automated driving vehicle 4.

The entering reservation acceptance unit 20 refers to the entering reservation stored in the parking reservation database 11, and determines whether a new entering reservation can be accepted. For example, in the case where the parking place 50 is scheduled to be full at the scheduled entering hour in the entering reservation, the entering reservation acceptance unit 20 determines that the new entering reservation cannot be accepted. The entering reservation acceptance unit 20 returns the determination result. In the case where the new entering reservation can be accepted, the entering reservation acceptance unit 20 stores the new entering reservation in the parking reservation database 11.

The entering reservation does not always need to be manually performed by the reservation user. The application of the entering reservation may be automatically performed by a function of an app in the user terminal 3. For example, in the case where calendar information (action schedule table) about the reservation user shows that the reservation user is scheduled to go to the facility having the parking place 50, the user terminal 3 may automatically perform the application of the entering reservation. The user terminal 3 may add the result of the application of the entering reservation, to the calendar information. When the facility having the parking place 50 is set as a destination of automated driving, the in-vehicle device (for example, an automated driving system) of the automated driving vehicle 4 may automatically perform the application of the entering reservation.

The vehicle determination unit 21 performs a position determination for the reservation object vehicle 4, as a condition for the generation of the authentication code. Specifically, the vehicle determination unit 21 determines whether the automated driving vehicle corresponding to the reservation vehicle information is in a preset parking place vicinity area D, based on position information that is transmitted from the automated driving vehicle 4 corresponding to the reservation vehicle information in the entering reservation. The automated driving vehicle 4 corresponding to the reservation vehicle information is the automated driving vehicle that is specified based on the reservation vehicle information. Hereinafter, the automated driving vehicle corresponding to the reservation vehicle information is referred to as a reservation object vehicle.

The position information transmitted from the reservation object vehicle 4 is position information recognized in the reservation object vehicle 4 by a position recognition technique such as a global positioning system (GPS), a global navigation satellite system (GNSS), a dead reckoning, or a simultaneous localization and mapping (SLAM). The position information may be transmitted to the parking place management server 1 through a wireless communication network, or may be transmitted from the reservation object vehicle 4 to a communicator of the parking place management server 1 provided in the parking place, by short-distance communication.

The parking place vicinity area D is an area that is set as a condition for the generation of the authentication code. The parking place vicinity area D can be set to an area that contains the outside of the parking place. An example of the parking place vicinity area D is shown in FIG. 2. As shown in FIG. 2, for example, the parking place vicinity area D can be set to an area within a certain distance L from an outside edge part E of the entrance of the parking place 50 in planar view.

The outside edge part E of the entrance of the parking place 50 is an edge part that is of the entrance of the parking place 50 and that is on the outermost side in planar view. The certain distance L is not particularly limited. The certain distance L may be 10 m, may be 100 m, or may be 300 m. The certain distance L can be appropriately set depending on the structure or surrounding environment of the parking place 50. The central base point of the parking place vicinity area D is not limited to the outside edge part E, and may be set to an arbitrary position in the parking place 50. The central base point of the parking place vicinity area D may be a center position of the parking place 50 on a map, or may be a center position of the facility containing the parking place 50.

The parking place vicinity area D only needs to be an area that extends to the outside of the entrance of the parking place compared to a parking place object area R described later. The parking place vicinity area D may be an area that contains the parking place object area R, or may be an area that contains the whole of the parking place. The parking place vicinity area D may be an area in the parking place, as long as the parking place vicinity area D is an area that extends to the outside of the entrance of the parking place relative to a parking place object area R.

The vehicle determination unit 21 performs a position determination for the reservation object vehicle 4, as a condition for the transmission of the authentication code. Specifically, the vehicle determination unit 21 determines whether the reservation object vehicle is in the parking place object area R, based on detection information (for example, the photographed image of the monitoring camera 12a) of the parking place sensor 12 provided in the parking place and the reservation vehicle information, or based on position information that is transmitted from the reservation object vehicle 4. The parking place object area R is an area that is set as a condition for the transmission of the authentication code.

As an example, the parking place object area R can be set to an area that contains the drop-off area 52 and the entrance traveling pathway 52a of the parking place 50, as shown in FIG. 2. The parking place object area R may be an area that contains only the drop-off area 52, or may be an area that contains only the entrance traveling pathway 52a. The parking place object area R may be an area that contains only the drop-off space 62 in the drop-off area 52. The parking place object area R may contain an area outside the parking place 50.

For example, based on the detection information of the parking place sensor 12 provided in the parking place 50, the vehicle determination unit 21 recognizes the vehicle number shown on the number plate of the vehicle that travels on the entrance traveling pathway 52a of the parking place 50, from the photographed image of the monitoring camera 12a provided on the entrance traveling pathway 52a. In the case where the recognized vehicle number coincides with the vehicle number included in the reservation vehicle information, the vehicle determination unit 21 determines that the reservation object vehicle 4 is in the parking place object area R. In this case, the parking place object area R may be set so as to correspond to a photographing range of the monitoring camera 12a.

In the case where the parking place object area R is set to the drop-off space 62, the vehicle determination unit 21 may recognize the vehicle number shown on the number plate of the vehicle stopped at the drop-off space 62, from the photographed image of the monitoring camera 12a in the drop-off area 52, and may determine that the reservation object vehicle 4 is in the parking place object area R when the recognized vehicle number coincides with the vehicle number included in the reservation vehicle information.

In the determination, the vehicle determination unit 21 may use a vehicle feature that can be recognized from the photographed image of the monitoring camera 12a and that is other than the vehicle number. In addition, the vehicle determination unit 21 may determine that the reservation object vehicle 4 is in the parking place object area R, when the vehicle determination unit 21 can specify the reservation object vehicle 4 by the short-distance communication with the parking place management server 1. In this case, the parking place object area R may be set to the range of the short-distance communication.

The vehicle determination unit 21 may determine whether the reservation object vehicle is in the parking place object area R, based on the position information transmitted from the reservation object vehicle 4. In the case where the parking place object area R is set to the entrance traveling pathway 52a, the vehicle determination unit 21 may determine that the reservation object vehicle 4 is in the parking place object area R, when the vehicle determination unit 21 recognizes that the reservation object vehicle 4 is on the entrance traveling pathway 52a based on the position information transmitted from the reservation object vehicle 4.

The vehicle determination unit 21 may determine whether the reservation object vehicle is in the parking place object area R, based on both the position information transmitted from the reservation object vehicle 4 and the detection information of the parking place sensor 12. For example, in the case where the parking place object area R is set to the drop-off space 62, the vehicle determination unit 21 starts the recognition of the vehicle number when the vehicle determination unit 21 acquires the position information from the reservation object vehicle 4 stopped at the drop-off space 62. The vehicle determination unit 21 may determine that the reservation object vehicle 4 is in the parking place object area R, when the vehicle number recognized from the photographed image of the monitoring camera 12a that photographs the drop-off space 62 coincides with the vehicle number included in the reservation vehicle information.

The hour determination unit 22 performs an hour determination as a condition for the generation of the authentication code. Specifically, the hour determination unit 22 determines whether the current hour is equal to or later than a generation start hour. The generation start hour, which is a condition for the generation of the authentication code, is an hour that is decided on the basis of the scheduled entering hour.

The generation start hour can be set to an hour that is earlier than the scheduled entering hour by a preset generation setting time. The preset generation setting time is a setting time for deciding the generation start hour on the basis of the scheduled entering hour. The generation setting time, which is not particularly limited, can be set to 40 minutes, as an example. The generation setting time may be 10 minutes, may be 15 minutes, or may be 1 hour.

Further, the hour determination unit 22 performs an hour determination as a condition for the transmission of the authentication code. Specifically, the hour determination unit 22 determines whether the current hour is equal to or later than a transmission start hour. The transmission start hour, which is a condition for the transmission of the authentication code, is an hour that is decided on the basis of the scheduled entering hour. The transmission start hour may be an hour equal to the generation start hour, or may be an hour later than the generation start hour. In other words, the generation start hour is an hour equal to the transmission start hour or an hour earlier than the transmission start hour.

The transmission start hour can be set to an hour that is earlier than the scheduled entering hour by a preset transmission setting time. The preset transmission setting time is a setting time for deciding the transmission start hour on the basis of the scheduled entering hour. The transmission setting time can be set to a time equal to the generation setting time or a time shorter than the generation setting time. The transmission setting time, which is not particularly limited, can be set to 30 minutes, as an example. The transmission setting time may be 5 minutes, may be 10 minutes, or may be 45 minutes.

The authentication code request unit 23 requests the vehicle management server 2 to generate and transmit the authentication code. In the case where the vehicle determination unit 21 determines that the reservation object vehicle 4 is in the parking place vicinity area D and where the hour determination unit 22 determines that the current hour is equal to or later than the generation start hour, the authentication code request unit 23 requests the vehicle management server 2 to generate the authentication code. The authentication code request unit 23 transmits entering reservation specifying information for specifying the entering reservation (for example, the content of the entering reservation, the entering reservation number assigned to the entering reservation, and the like), in association with the request for the generation of the authentication code.

In the case where the vehicle determination unit 21 determines that the reservation object vehicle 4 is in the parking place object area R and where the hour determination unit 22 determines that the current hour is equal to or later than the transmission start hour, the authentication code request unit 23 requests the vehicle management server 2 to transmit the authentication code. The authentication code request unit 23 transmits the entering reservation specifying information in association with the request for the transmission of the authentication code.

At the time of leaving the automated valet parking, the authentication code request unit 23 requests the vehicle management server 2 to generate and transmit the authentication code for the check-out, when the reservation object vehicle 4 is stopped at the pick-up space 63 and a shut-down is completed. The shut-down will be described later.

The authentication code request unit 23 transmits the entering reservation specifying information to the vehicle management server 2, in association with the request for the generation and transmission of the authentication code. The vehicle management server 2 generates and transmits the authentication code in response to the request from the authentication code request unit 23.

The check-in processing unit 24 performs a process (a verification request for the authentication code) relevant to the check-in, when a check-in operation is performed to the check-in acceptance machine 13a (inside acceptance machine 13). The check-in operation is an operation for starting the check-in for the automated valet parking.

The check-in operation includes an operation of inputting the authentication code and an operation of inputting the content of the entering reservation. A user that performs the check-in operation is referred to as an operation user. The operation user is recognized as being identical to the reservation user by the verification of the input authentication code and the input content of the entering reservation. The check-in operation may be performed by directly operating the check-in acceptance machine 13a, or may be performed by the short-distance communication from the user terminal 3 or the in-vehicle device of the reservation object vehicle 4. The short-distance communication from the user terminal 3 to the check-in acceptance machine 13a can be performed, for example, on the facility entrance passage 52c of the parking place 50.

In the case where the content of the entering reservation is input by the check-in operation, the check-in processing unit 24 determines whether the input content of the entering reservation coincides with the content of the entering reservation stored in the parking reservation database 11. The content of the entering reservation that is input does not need to be all of parts relevant to the entering reservation, and may be some of the parts. For example, the content of the entering reservation includes the full name and contact information of the reservation user. The reservation number assigned at the time of the entering reservation may be used as the content of the entering reservation. The biological information about the reservation user may be used for the confirmation of the user in the entering reservation. Security can be enhanced by double check with the entering reservation and the authentication code.

In the case where the check-in processing unit 24 determines that the input content of the entering reservation coincides with the content of the entering reservation stored in the parking reservation database 11, the check-in processing unit 24 requests the vehicle management server 2 to verify the authentication code input by the check-in operation. The check-in processing unit 24 transmits the input authentication code to the vehicle management server 2, in association with the entering reservation specifying information. The check-in processing unit 24 stores the coinciding entering reservation in the parking reservation database 11, as the entering reservation for which the check-in has been performed. In the case where the verification of the coincidence between the input authentication code and the transmitted authentication code is successful, the vehicle management server 2 delivers vehicle connection information to the parking place management server 1. The vehicle connection information is connection information by which the parking place management server 1 acquires information necessary for the start of the automated valet parking, from the reservation object vehicle 4.

In the case where the check-in processing unit 24 determines that the input content of the entering reservation does not coincide with the content of the entering reservation stored in the parking reservation database 11, the check-in processing unit 24 gives notice of an entering reservation error to the operation user, by performing an error display on the check-in acceptance machine 13a.

In the case where the vehicle connection information is delivered from the vehicle management server 2, the start condition determination unit 25 determines a start condition for starting the automated valet parking. The start condition includes a vehicle condition that is a condition about the vehicle and an environment condition that is a condition about the external environment of the vehicle.

The start condition determination unit 25 acquires the vehicle information from the reservation object vehicle 4, using the vehicle connection information. The vehicle information includes stop information relevant to engine stop of the reservation object vehicle 4 and fail information relevant to vehicle abnormality. The vehicle information may include information indicating that no human is in a vehicle cabin of the reservation object vehicle 4, and information indicating that all doors of the reservation object vehicle 4 are locked. The vehicle information may include information relevant to the automated driving function. The vehicle information may include vehicle body information such as vehicle type, vehicle length, vehicle width and turning radius. The vehicle information may include a detection result of the external environment by a sensor of the reservation object vehicle 4 (a detection result of a human, a vehicle or the like in the periphery of the reservation object vehicle 4). Further, based on the detection information of the parking place sensor 12, the start condition determination unit 25 confirms that the reservation object vehicle 4 has been stopped at a position (for example, the drop-off space 62) allowing the start of the automated valet parking.

The start condition determination unit 25 determines whether the reservation object vehicle 4 satisfies the vehicle start condition, based on the vehicle information and the detection information of the parking place sensor 12. The start condition determination unit 25 determines that the vehicle condition is satisfied, for example, in the case where the engine of the reservation object vehicle 4 has been stopped, where there is no vehicle abnormality that obstructs the automated valet parking, and where the reservation object vehicle 4 has been stopped at a position allowing the start of the automated valet parking. The start condition determination unit 25 may determine that the vehicle condition is satisfied, in the case where additional conditions are also satisfied, that is, in the case where no human is in the vehicle cabin of the reservation object vehicle 4 and where all doors of the reservation object vehicle 4 are locked.

The start condition determination unit 25 determines whether the environment condition is satisfied, based on the detection information of the parking place sensor 12 and/or the vehicle information (the detection result of the external environment of the reservation object vehicle 4). The start condition determination unit 25 determines that the environment condition is satisfied, in the case where a moving vehicle (for example, a vehicle that is entering the parking place or a vehicle that is traveling by the automated valet parking) or human that interferes with the start of the automated valet parking does not exist near the reservation object vehicle 4.

In the case where the vehicle condition and the environment condition are satisfied, the start condition determination unit 25 determines that the start condition for the automated valet parking is satisfied. In the case where a failure that obstructs the automated valet parking occurs in an infrastructure such as the parking place management server 1, the start condition determination unit 25 determines that the start condition for the automated valet parking is not satisfied, regardless of the determination results of the vehicle condition and the environment condition.

The start condition determination unit 25 repeats the determination until the start condition is satisfied. In the case where the vehicle condition is not satisfied due to a vehicle abnormality or the like or in the case where the start condition is not satisfied even after elapse of a certain time, the start condition determination unit 25 may give notice to the user terminal 3 of the reservation user and a parking place administrator.

In the case where the start condition determination unit 25 determines that the start condition is satisfied, the vehicle start-up request unit 26 performs a vehicle wake-up request for the reservation object vehicle 4, to the vehicle management server 2. The vehicle wake-up request is a request for activating the reservation object vehicle 4 in which the engine has been stopped (for example, a request for starting up the engine). The vehicle start-up request unit 26 gives notice of information indicating that the parking place management server 1 has the vehicle operation authority or server specifying information for specifying the parking place management server 1, to the vehicle management server 2, together with the vehicle wake-up request.

The method of the notification of the vehicle operation authority is not particularly limited. For example, the vehicle start-up request unit 26 may transmit the vehicle connection information transmitted from the vehicle management server 2, or may transmit the server specifying information for specifying the parking place management server 1, such that the vehicle management server 2 confirms that the parking place management server 1 has the vehicle operation authority. The engine of the reservation object vehicle 4 in which the engine has been stopped is started up by a wake-up instruction from the vehicle management server 2, so that the automated valet parking is started. The automated parking system may be activated instead of the start-up of the engine.

In the embodiment, descriptions of processes after the start of the automated valet parking are omitted. In processes for the automated valet parking, various well-known techniques can be employed. For example, processes described in Japanese Patent Application No 2019-168408 may be employed as processes for the automated valet parking. Subsequently, a functional configuration that is used at the time of leaving the automated valet parking (at the time of end) will be described.

The pick-up position arrival determination unit 27 determines whether the reservation object vehicle 4 has arrived at the pick-up space 63 of the pick-up area 53, at the time of leaving the automated valet parking. For example, when the current hour is an hour that is earlier than the scheduled leaving hour by a certain time or when the reservation user performs the leaving request, the automated parking system 100 performs the leaving of the reservation object vehicle 4 in the automated valet parking. The reservation object vehicle 4 that is the leaving object performs the automated driving so as to arrive at the pick-up space 63 in the pick-up area 53 based on an instruction from the parking place management server 1.

The pick-up position arrival determination unit 27 determines whether the reservation object vehicle 4 has arrived at the pick-up space 63 of the pick-up area 53, based on the detection result of the parking place sensor 12 (for example, based on the photographed image of the monitoring camera 12*a*). In the case where the empty sensor 12*b* is provided at the pick-up space 63, the pick-up position arrival determination unit 27 may perform the determination using the detection result of the empty sensor 12*b*. The pick-up position arrival determination unit 27 may perform the determination using the position information transmitted from the reservation object vehicle 4, together with the detection result of the parking place sensor 12.

In the case where the pick-up position arrival determination unit 27 determines that the reservation object vehicle 4 has arrived at the pick-up space 63, the vehicle stop request unit 28 performs a vehicle shut-down request to the vehicle management server 2. The vehicle shut-down request is a request for stopping the engine of the reservation object vehicle 4 in which the engine is being driven. The vehicle start-up request unit 26 gives notice that the parking place management server 1 has the vehicle operation authority, to the vehicle management server 2, together with the vehicle shut-down request. The engine of the reservation object vehicle 4 is stopped by a shut-down instruction from the vehicle management server 2. The reservation object vehicle 4 transmits a shut-down completion notice to the vehicle management server 2, in response to the engine stop. The vehicle management server 2 transmits the shut-down completion notice to the parking place management server 1.

In the case where the vehicle stop request unit 28 receives the shut-down completion notice for the reservation object vehicle 4, the vehicle stop request unit 28 confirms (reconfirms) that the reservation object vehicle 4 has been stopped at the pick-up space 63. The vehicle stop request unit 28 confirms that the reservation object vehicle 4 has been stopped at the pick-up space 63, based on the detection result of the parking place sensor 12. The vehicle stop request unit 28 may skip the reconfirmation.

In the case where the reservation object vehicle 4 has been stopped at the pick-up space 63, the vehicle stop request unit 28 requests the vehicle management server 2 to generate and transmit the authentication code for the check-out. The authentication code for the check-out may be different from the authentication code for the check-in.

The check-out processing unit 29 performs a process (a verification request for the authentication code for the check-out) relevant to the check-out, when a check-out operation is performed to the check-out acceptance machine 13b (inside acceptance machine 13). The check-out operation is an operation for staring the check-out for the automated valet parking.

The check-out operation includes an operation of inputting the authentication code and an operation of inputting the content of the entering reservation. The check-out operation may be performed by directly operating the check-out acceptance machine 13b, or may be performed by the short-distance communication from the user terminal 3. The short-distance communication to the check-out acceptance machine 13b can be performed, for example, on the facility exit passage 53b of the parking place 50.

In the case where the content of the entering reservation is input by the check-out operation, the check-out processing unit 29 determines whether the input content of the entering reservation coincides with the content of the entering reservation that is stored in the parking reservation database 11 and for which the check-in has been performed.

In the case where the input content of the entering reservation does not coincide with the content of the entering reservation that is stored in the parking reservation database 11 and for which the check-in has been performed, the check-out processing unit 29 gives notice of the entering reservation error to the operation user, by performing an error display on the check-out acceptance machine 13b.

In the case where the input content of the entering reservation coincides with the content of the entering reservation that is stored in the parking reservation database 11 and for which the check-in has been performed, the check-out processing unit 29 requests the vehicle management server 2 to verify the authentication code for the check-out. The check-out processing unit 29 transmits the input authentication code for the check-out, to the vehicle management server 2, in association with the entering reservation specifying information. The vehicle management server 2 terminates the grant of the vehicle operation authority for the reservation object vehicle 4 to the parking place management server 1, so that the check-out is completed.

Vehicle Management Server

Next, the vehicle management server 2 will be described. The vehicle management server 2 is a server that manages the automated driving vehicle. For example, the vehicle management server 2 is provided in a vehicle management center Cs. For example, the vehicle management center Cs is a facility of an automobile manufacturer or an operating company for MaaS (Mobility as a Service), or a part of the facility. The position of the vehicle management center Cs is not particularly limited.

The vehicle management server 2 manages the vehicle operation authority for the automated driving vehicle. In the vehicle management server 2, various security measures for managing the vehicle operation authority for the automated driving vehicle are implemented. The vehicle management server 2 may be controlled by a company (an automobile manufacturer or an operating company for MaaS) that is authorized by a reliable public institution, or may be controlled by a public institution relevant to the management of the automated driving vehicle.

As shown in FIG. 1, the vehicle management server 2 is configured to be capable of communicating with the user terminal 3 and the reservation object vehicle 4, in addition to the parking place management server 1. The hardware configuration of the vehicle management server 2 may be the same as the hardware configuration of the parking place management server 1 (see FIG. 3). The vehicle management server 2 is connected to a vehicle management parking reservation database 14.

The vehicle management parking reservation database 14 is a database in which the vehicle management server 2 stores the content of the entering reservation of the reservation object vehicle 4. In the vehicle management parking reservation database 14, the content of the entering reservation is stored on the basis of the vehicle. When the generation and transmission of the authentication code are performed by the vehicle management server 2, the authentication code and the content of the entering reservation are associated and stored in the vehicle management parking reservation database 14. The vehicle management parking reservation database 14 does not always need to be provided in the vehicle management center Cs, and may be provided in a different spot as long as the vehicle management parking reservation database 14 can communicate with the vehicle management server 2.

Subsequently, the functional configuration of the vehicle management server 2 will be described with use of FIG. 4. As shown in FIG. 4, the vehicle management server 2 includes an entering reservation recognition unit 30, an authentication code generation unit 31, a user request acceptance unit 32, an authentication code transmission unit 33, a verification unit 34, a user notification unit 35, and a vehicle instruction unit 36.

The entering reservation recognition unit 30 recognizes the content of the entering reservation accepted by the parking place management server 1, by communication with the parking place management server 1. The entering reservation recognition unit 30 stores the content of the entering reservation in the vehicle management parking reservation database 14.

In the case where the authentication code generation unit 31 receives the request for the generation of the authentication code from the authentication code request unit 23 of the parking place management server 1, the authentication code generation unit 31 generates the authentication code. The authentication code generation unit 31 specifies the entering reservation based on the entering reservation specifying information (for example, the content of the entering reservation, the entering reservation number assigned tto the entering reservation, and the like) received together with the request for the generation of the authentication code. The authentication code generation unit 31 generates the authentication code corresponding to the specified entering reservation. In the case where the authentication code generation unit 31 receives the request for the generation of the authentication code for the check-out, the authentication code generation unit 31, similarly, generates the authentication code for the check-out.

The user request acceptance unit 32 accepts the authentication code request that is the request for the transmission of the authentication code from the reservation user. For example, the user request acceptance unit 32 accepts the authentication code request from the user terminal 3 of the reservation user or the in-vehicle device (for example, a human machine interface (HMI) of the in-vehicle device) of the reservation object vehicle 4. The authentication code request is associated with the entering reservation specifying information.

The user request acceptance unit 32 accepts the authentication code request, for example, when the user terminal 3 of the reservation user or the in-vehicle device of the reservation object vehicle 4 accesses (logs in) the vehicle management server 2 and a particular operation (for example, a click of an authentication code request button) is performed. The user request acceptance unit 32 may accept the authentication code request from the inside acceptance machine 13, in response to the operation by the reservation user.

In the case where the user request acceptance unit 32 accepts the authentication code request before receiving the request for the transmission of the authentication code from the parking place management server 1, the user request acceptance unit 32 may give notice that the authentication code is transmitted after the conditions for the transmission of the authentication code is satisfied, to the user terminal 3 or the in-vehicle device. In this case, the user request acceptance unit 32 may give notice of a condition that is of the conditions for the transmission of the authentication code and that is not satisfied (for example, the reservation object vehicle 4 is excessively distant from the parking place, or the current hour is not an hour equal to or later than the transmission start hour).

In the case where the authentication code transmission unit 33 receives the request for the transmission of the authentication code from the authentication code request unit 23 of the parking place management server 1, the authentication code transmission unit 33 transmits the authentication code to the reservation user, after the user request acceptance unit 32 accepts the authentication code request.

The authentication code transmission unit 33 transmits the authentication code to a device that is of the user terminal 3 and the in-vehicle device and from which the authentication code request has been performed. The authentication code transmission unit 33 may transmit the authentication code to both of the user terminal 3 and the in-vehicle device. The authentication code transmission unit 33 may transmit authentication codes that are different between the user terminal 3 and the in-vehicle device. For example, the authentication code transmission unit 33 may transmit the authentication code to the user terminal 3, as a two-dimensional code (for example, the QR code) that can be recognized as an image, and may transmit the authentication code to the in-vehicle device, as a number or password that can be manually input to the inside acceptance machine 13.

Even when the user request acceptance unit 32 accepts the authentication code request, the authentication code transmission unit 33 does not transmit the authentication code, until the authentication code transmission unit 33 receives the request for the transmission of the authentication code from the authentication code request unit 23 of the parking place management server 1.

In the case where the authentication code transmission unit 33 receives the request for the transmission of the authentication code for the check-out from the authentication code request unit 23 of the parking place management server 1, the authentication code transmission unit 33, similarly, transmits the authentication code for the check-out, after the user request acceptance unit 32 accepts the authentication code request for the check-out. Even when the user request acceptance unit 32 accepts the authentication code request for the check-out, the authentication code transmission unit 33 does not transmit the authentication code for the check-out, until the authentication code transmission unit 33 receives the request for the transmission of the authentication code for the check-out from the authentication code request unit 23 of the parking place management server 1.

In the case where the verification unit 34 receives the verification request for the authentication code from the check-in processing unit 24 of the parking place management server 1, the verification unit 34 determines (verifies) whether the authentication code input by the operation user (the authentication code received from the parking place management server 1) coincides with the authentication code transmitted by the vehicle management server 2.

The verification unit 34 specifies the authentication code that is a verification object (the authentication code transmitted to the reservation user), from the entering reservation stored in the vehicle management parking reservation database 14, based on the entering reservation specifying information associated with the authentication code in the parking place management server 1. The verification unit 34 determines whether the authentication code input from the parking place management server 1 coincides with the transmitted authentication code.

In the case where the input authentication code coincides with the transmitted authentication code, the verification unit 34 transmits the vehicle connection information about the reservation object vehicle 4, to the parking place management server 1. The verification unit 34 registers the parking place management server 1, as a server that has the vehicle operation authority for the reservation object vehicle 4.

Further, in the case where the verification unit 34 receives the verification request for the authentication code from the check-out processing unit 29 of the parking place management server 1, the verification unit 34 determines (verifies) whether the authentication code for the check-out input by the operation user coincides with the authentication code transmitted by the vehicle management server 2. In the case of coincidence of the authentication codes, the verification unit 34 terminates the grant of the vehicle operation authority for the reservation object vehicle 4 to the parking place management server 1. For example, the verification unit 34 eliminates the parking place management server 1 from servers that have the vehicle operation authority for the reservation object vehicle 4.

The user notification unit 35 performs various notifications to the reservation user. In the case where the verification unit 34 determines that the authentication code input by the operation user does not coincide with the transmitted authentication code, the user notification unit 35 gives notice of a verification error to the user terminal 3 of the reservation user. The reservation user in this case is not the operation user that performs the check-in operation, but the reservation user that performs the entering reservation specified from the entering reservation specifying information.

The user notification unit 35 gives notice of the verification error to the operation user, by performing an error display on the check-in acceptance machine 13a through the parking place management server 1. In the case of the verification error at the time of the check-out, the user notification unit 35 gives a similar notice.

In the case where the verification unit 34 determines that the authentication code input by the operation user coincides with the transmitted authentication code (in the case where the identity between the operation user and the reservation user can be confirmed), the user notification unit 35 gives notice of completion of the check-in, to the user terminal 3 of the reservation user. Further, the user notification unit 35 performs the display of the completion of the check-in on the check-in acceptance machine 13a.

In the case where the vehicle start-up request unit 26 of the parking place management server 1 performs the vehicle wake-up request for the reservation object vehicle 4, the vehicle instruction unit 36 determines whether the requester has the vehicle operation authority.

In the case where the parking place management server 1 is registered as the server that has the vehicle operation authority for the reservation object vehicle 4, the vehicle instruction unit 36 determines that the requester has the vehicle operation authority. In the case where the vehicle instruction unit 36 determines that the requester has the vehicle operation authority, the vehicle instruction unit 36 performs the wake-up instruction to the reservation object vehicle 4.

The wake-up instruction is an instruction for starting up the engine of the reservation object vehicle 4 that has been stopped at the drop-off space 62 in the drop-off area 52 and in which the engine has been stopped. The wake-up instruction is provided with authentication information by which the vehicle authenticates that the wake-up instruction is an instruction from the vehicle management server 2.

In the case where the parking place management server 1 is not registered as the server that has the vehicle operation authority for the reservation object vehicle 4 and the vehicle instruction unit 36 determines that the requester has no vehicle operation authority, the vehicle instruction unit 36 gives notice that an unauthorized request has been performed, to the user terminal 3 of the reservation user of the reservation object vehicle 4 that is the object of the wake-up instruction. The vehicle instruction unit 36 gives notice that the unauthorized request has been performed from the parking place management server 1, to the parking place administrator in the parking place management center Ps.

In the case where the vehicle shut-down request for the reservation object vehicle 4 is performed from the vehicle stop request unit 28 of the parking place management server 1, the vehicle instruction unit 36 determines whether the requester has the vehicle operation authority. In the case where the vehicle instruction unit 36 determines that the requester has the vehicle operation authority, the vehicle instruction unit 36 performs the shut-down instruction to the reservation object vehicle 4.

The shut-down instruction is an instruction for stopping the engine of the reservation object vehicle 4 that has been stopped at the pick-up space 63 in the pick-up area 53 with the engine driven. The shut-down instruction is provided with authentication information by which the vehicle authenticates that the shut-down instruction is an instruction from the vehicle management server 2. In the case where the vehicle instruction unit 36 determines that the requester has no vehicle operation authority, the vehicle instruction unit 36 gives notice of the unauthorized request to the user terminal 3 of the reservation user and the parking place administrator, similarly to the case of the vehicle wake-up request.

User Terminal

The user terminal 3 is a mobile information terminal of the reservation user that performs the entering reservation for the automated valet parking. The user terminal 3 may be a smartphone, or may be a tablet-type or notebook-type mobile information terminal. For example, the user terminal 3 is registered in the reservation object vehicle 4, as a terminal of a possessor of the reservation object vehicle 4. The user terminal 3 may be a terminal of a temporary possessor due to rental or a user registered in the reservation object vehicle 4 as an authority possessor due to transfer of an instruction authority from the possessor. For example, the user terminal 3 is constituted by a computer including a processor such as a CPU, a memory such as a ROM or a RAM, a communication device, and a user interface including a touch screen display.

The user terminal 3 is connected to the parking place management server 1 by wireless communication, and thereby performs the entering reservation for the automated valet parking. Further, the user terminal 3 is connected to the vehicle management server 2 by wireless communication, and thereby can perform the authentication code request. The user terminal 3 performs the entering reservation to the parking place management server 1 and the authentication code request to the vehicle management server 2, in response to the operation by the reservation user.

In the case where the user terminal 3 receives the authentication code from the vehicle management server 2, the user terminal 3 gives notice of receipt of the authentication code, to the reservation user. The user terminal 3 displays the authentication code (for example, the QR code) on the display, in response to the operation by the reservation user. The user terminal 3 may automatically display the authentication code on the display when the user terminal 3 receives the authentication code. The reservation user performs the check-in using the authentication code, for example, by holding the user terminal 3 over the check-in acceptance machine 13a while the authentication code is displayed.

In the case where the user terminal 3 can transmit the authentication code to the check-in acceptance machine 13a by short-distance communication, it is not necessary to display the authentication code for the reservation user. The reservation user may perform the check-in using the authentication code, by operating the user terminal 3.

Automated Driving Vehicle

Figure 5:
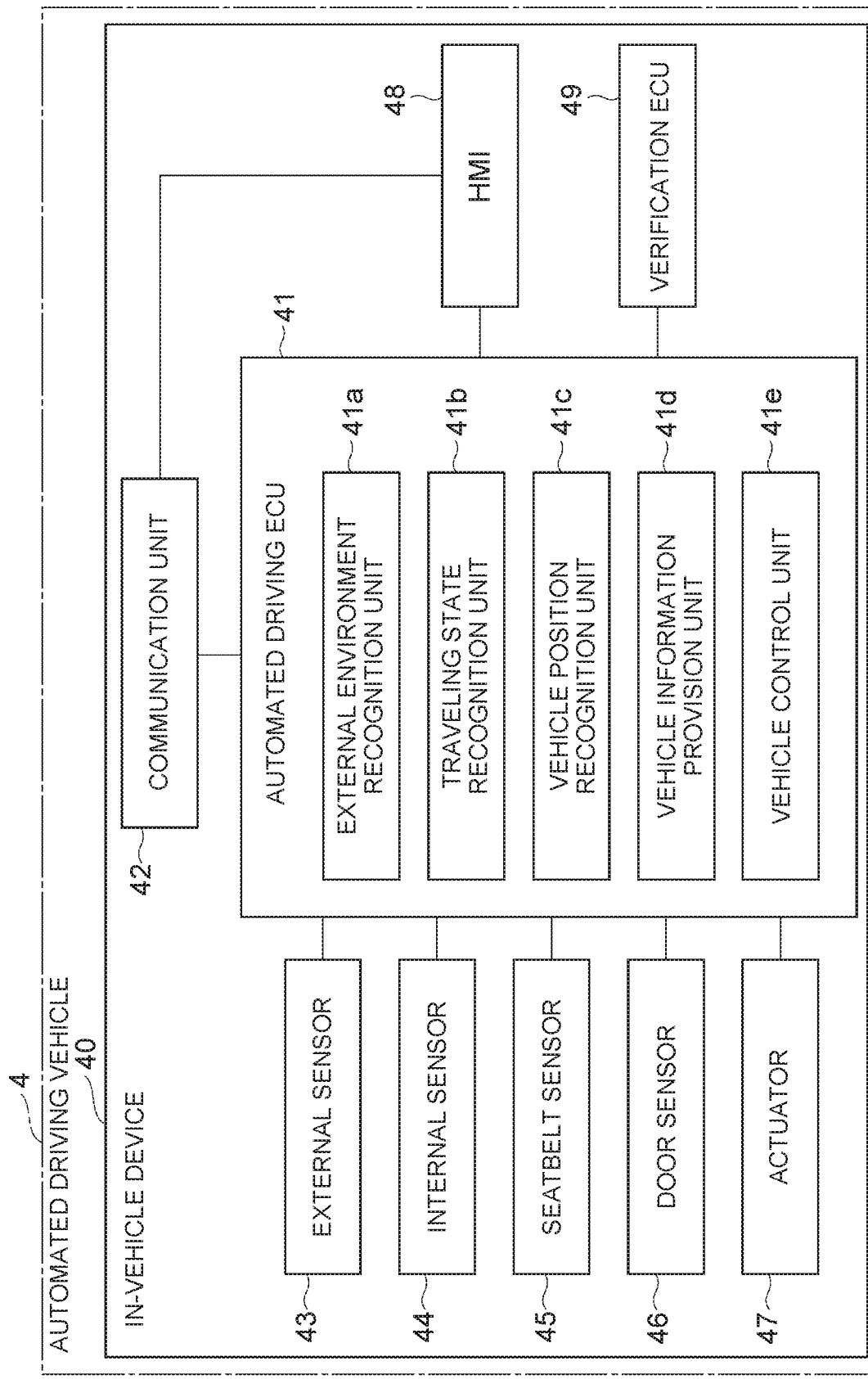
FIG. 5 is a block diagram showing an example of a configuration of an automated driving vehicle.

Next, an example of a configuration of the automated driving vehicle (reservation object vehicle) 4 will be described with reference to FIG. 5. FIG. 5 is a block diagram showing an example of the configuration of the automated driving vehicle 4.

As shown in FIG. 5, the automated driving vehicle 4 includes an in-vehicle device 40. The in-vehicle device 40 is a device that includes an HMI 48 described later. As an example, the in-vehicle device 40 may be an automated driving system. The in-vehicle device 40 may correspond to a part of an automated driving system.

The in-vehicle device 40 includes an automated driving ECU 41. The automated driving ECU 41 is an electronic control unit that includes a CPU, a ROM, a RAM and the like. The automated driving ECU 41 realizes various functions, for example, by loading programs recorded in the ROM on the RAM and executing the programs loaded on the RAM with the CPU. The automated driving ECU 41 may be constituted by a plurality of electronic units.

The automated driving ECU 41 is connected to a communication unit 42, an external sensor 43, an internal sensor 44, a seatbelt sensor 45, a door sensor 46, an actuator 47, the HMI 48 and a verification ECU 49.

The communication unit 42 is a communication device that controls wireless communication with the exterior of the automated driving vehicle 4. The communication unit 42 transmits and receives a variety of information by communication with the parking place management server 1. For example, the communication unit 42 transmits the vehicle information to the parking place management server 1, and acquires information necessary for the automated valet parking from the parking place management server 1 (for example, information about a landmark along the target route). Further, the communication unit 42 communicates with the user terminal 3 associated with the automated driving vehicle 4. The communication unit 42 may have a function to perform short-distance communication with the inside acceptance machine 13.

The external sensor 43 is an in-vehicle sensor that detects the external environment of the automated driving vehicle 4. The external sensor 43 includes at least a camera. The camera is a photographing apparatus that photographs the external environment of the automated driving vehicle 4. For example, the camera is provided on the backside of a windshield of the automated driving vehicle 4, and photographs a forward view of the vehicle. The camera transmits photograph information relevant to the external environment of the automated driving vehicle 4, to the automated driving ECU 41. The camera may be a monocular camera, or may be a stereo camera. A plurality of cameras may be provided, and in addition to the forward view of the automated driving vehicle 4, a rightward view, a leftward view and a rearward view may be photographed.

The external sensor 43 may include a radar sensor. The radar sensor is a detection apparatus that detects a physical body in the periphery of the automated driving vehicle 4 using an electric wave (for example, a millimeter wave) or a light. Examples of the radar sensor include a millimeter-wave radar and a LIDAR (Light Detection and Ranging). The radar sensor detects the physical body by transmitting the electric wave or light to the periphery of the automated driving vehicle 4 and receiving the electric wave or light reflected by the physical body. The radar sensor transmits the detected physical body information to the automated driving ECU 41. Further, the external sensor 43 may include a sonar sensor that detects a sound in the exterior of the automated driving vehicle 4.

The internal sensor 44 is an in-vehicle sensor that detects a traveling state of the automated driving vehicle 4. The internal sensor 44 includes a vehicle speed sensor, an acceleration sensor and a yaw rate sensor. The vehicle speed sensor is a detector that detects the speed of the automated driving vehicle 4. As the vehicle speed sensor, a wheel speed sensor that is provided for a wheel of the automated driving vehicle 4 or a drive shaft to rotate integrally with the wheel and that detects the rotation speed of the wheel can be used. The vehicle speed sensor transmits the detected vehicle speed information (wheel speed information) to the automated driving ECU 41.

The acceleration sensor is a detector that detects the acceleration of the automated driving vehicle 4. For example, the acceleration sensor includes a front-rear acceleration sensor that detects the acceleration of the automated driving vehicle 4 in the front-rear direction of the automated driving vehicle 4. The acceleration sensor may include the lateral acceleration sensor that detects the lateral acceleration of the automated driving vehicle 4. For example, the acceleration sensor transmits the acceleration information about the automated driving vehicle 4, to the automated driving ECU 41. The yaw rate sensor is a detector that detects the yaw rate (turning angle velocity) around the vertical axis at the center of gravity of the automated driving vehicle 4. As the yaw rate sensor, for example, a gyroscope sensor can be used. The yaw rate sensor transmits the detected yaw rate information about the automated driving vehicle 4, to the automated driving ECU 41.

The seatbelt sensor 45 is a sensor that is provided for each seat of the automated driving vehicle 4 and that detects whether the occupant wears the seatbelt. In the embodiment, the seatbelt sensor 45 is used for determination of whether no human is in the automated driving vehicle 4 that starts the automated valet parking. A sitting sensor that detects the pressure of the occupant sitting on the seat, or a vehicle cabin camera that photographs the vehicle cabin may be used instead of the seatbelt sensor 45.

The door sensor 46 is a sensor that detects a state where a door of the automated driving vehicle 4 is opened, or a state where the door is closed. The door sensor 46 is used for determination of whether the door of the automated driving vehicle 4 that starts the automated valet parking is closed.

The actuator 47 is an apparatus that is used for control of the automated driving vehicle 4. The actuator 47 includes at least a drive actuator, a brake actuator and a steering actuator. The drive actuator controls the supply amount (throttle opening degree) of air to the engine, depending on a control signal from the automated driving ECU 41, and controls drive power of the automated driving vehicle 4. In the case where the automated driving vehicle 4 is a hybrid vehicle, in addition to the supply amount of the air to the engine, a control signal from the automated driving ECU 41 is input to a motor as dynamic power source, so that the drive power is controlled. In the case where the automated driving vehicle 4 is an electric vehicle, a control signal from the automated driving ECU 41 is input to a motor as the dynamic power source, so that the drive power is controlled. In these cases, the motor as the dynamic power source constitutes the actuator 47.

The brake actuator controls a brake system depending on a control signal from the automated driving ECU 41, and controls braking power that is given to wheels of the automated driving vehicle 4. As the brake system, for example, a hydraulic brake system can be used. The steering actuator controls drive of an assist motor that is of an electric power steering system and that controls steering torque, depending on a control signal from the automated driving ECU 41. Thereby, the steering actuator controls the steering torque of the automated driving vehicle 4.

The HMI 48 is an interface for exchanging information between the reservation user riding in the automated driving vehicle 4 and the in-vehicle device 40. For example, the HMI 48 includes an output unit such as a display and a speaker, and an input unit such as a touch screen and a button.

The HMI 48 is connected to the parking place management server 1 through the communication unit 42, so that the entering reservation for the automated valet parking can be performed. Further, the HMI 48 is connected to the vehicle management server 2 through the communication unit 42, so that the authentication code request can be performed. The HMI 48 performs the entering reservation and the authentication code request, in response to the operation by the reservation user.

In the case where the HMI 48 receives the authentication code from the vehicle management server 2, the HMI 48 may display the authentication code (for example, the password) on the display for the reservation user. In this case, the reservation user can perform the check-in using the authentication code on the check-in acceptance machine 13*a*, after the reservation user drops off the automated driving vehicle 4.

In the case where the HMI 48 can transmit the authentication code to the check-in acceptance machine 13*a* by short-distance communication through the communication unit 42, the HMI 48 does not need to display the authentication code for the reservation user. The reservation user may drop off the automated driving vehicle 4 after the reservation user transmits the authentication code to the check-in acceptance machine 13*a* by operating the HMI 48, and then may continue the check-in operation on the check-in acceptance machine 13*a*.

The verification ECU 49 is an electronic unit that confirms that an external instruction to the automated driving vehicle 4 is not an unlawful instruction. The verification ECU 49 may be integral with the automated driving ECU 41. In the verification ECU 49, authentication information for confirming that the external instruction is not an unlawful instruction is stored.

In the case where the verification ECU 49 receives the wake-up instruction from the vehicle management server 2, the verification ECU 49 determines (verifies) whether the authentication information attached to the wake-up instruction coincides with the stored authentication information. In the case where the verification ECU 49 determines that the authentication information attached to the wake-up instruction coincides with the stored authentication information, the verification ECU 49 transmits the wake-up instruction to the automated driving ECU 41 because the wake-up instruction is not an unlawful instruction.

In the case where the verification ECU 49 determines that the authentication information attached to the wake-up instruction does not coincide with the stored authentication information, the verification ECU 49 does not transmit the wake-up instruction to the automated driving ECU 41 because the wake-up instruction is an unlawful instruction. At this time, the verification ECU 49 gives notice of an error code to the vehicle management server 2. The same goes for the shut-down instruction.

Next, an example of a functional configuration of the automated driving ECU 41 will be described. The automated driving ECU 41 includes an external environment recognition unit 41*a*, a traveling state recognition unit 41*b*, a vehicle position recognition unit 41*c*, a vehicle information provision unit 41*d* and a vehicle control unit 41*e*.

The external environment recognition unit 41*a* recognizes the external environment of the automated driving vehicle 4, based on the detection result of the external sensor 43 (the photographed image of the camera or the physical body information detected by the radar sensor). The external environment includes the relative position of the peripheral physical body to the automated driving vehicle 4. The external environment may include the relative speed of the peripheral physical body to the automated driving vehicle 4 and the movement direction. The external environment recognition unit 41*a* recognizes the physical body such as another vehicle and a column of the parking place, by pattern matching or the like. The external environment recognition unit 41*a* may recognize a gate of the parking place, a wall of the parking place, a pole, a safety cone and the like.

Further, the external environment recognition unit 41*a* may recognize a traveling boundary (driving boundary) on the parking place, by white line recognition.

The traveling state recognition unit 41*b* recognizes the traveling state of the automated driving vehicle 4, based on the detection result of the internal sensor 44. The traveling state includes the vehicle speed of the automated driving vehicle 4, the acceleration of the automated driving vehicle 4, and the yaw rate of the automated driving vehicle 4. Specifically, the traveling state recognition unit 41*b* recognizes the vehicle speed of the automated driving vehicle 4, based on the vehicle speed information of the vehicle speed sensor. The traveling state recognition unit 41*b* recognizes the acceleration of the automated driving vehicle 4, based on the vehicle speed information of the acceleration sensor. The traveling state recognition unit 41*b* recognizes the orientation of the automated driving vehicle 4, based on the yaw rate information of the yaw rate sensor.

The vehicle position recognition unit 41*c* recognizes the position of the automated driving vehicle 4 in the parking place, based on parking place map information acquired from the parking place management server 1 through the communication unit 42 and the external environment recognized by the external environment recognition unit 41*a*.

The vehicle position recognition unit 41*c* recognizes the position of the automated driving vehicle 4 in the parking place, based on the position information about the landmark in the parking place, which is the position information included in the parking place map information, and the relative position of the landmark to the automated driving vehicle 4, which is the relative position recognized by the external environment recognition unit 41*a*. As the landmark, a physical body provided so as to be fixed on the parking place can be used. For example, at least one of the column of the parking place, the wall of the parking place, the pole, the safety cone and the like is used as the landmark. The traveling boundary may be used as the landmark.

In addition, the vehicle position recognition unit 41*c* may recognize the position of the automated driving vehicle 4 by dead reckoning, based on the detection result of the internal sensor 44. Further, the vehicle position recognition unit 41*c* may recognize the position of the automated driving vehicle 4 by communication with a beacon provided in the parking place.

The vehicle information provision unit 41*d* provides the vehicle information to the parking place management server 1 through the communication unit 42. The vehicle information provision unit 41*d* provides the vehicle information by which the start condition determination unit 25 of the parking place management server 1 determines whether the start condition for the automated valet parking is satisfied. As the vehicle information, the vehicle information provision unit 41*d* provides the fail information relevant to the vehicle abnormality and the stop information relevant to the engine stop of the automated driving vehicle 4, to the parking place management server 1.

Furthermore, the vehicle information provision unit 41*d* may provide the information indicating that no human is in the vehicle cabin of the automated driving vehicle 4, based on the detection result of the seatbelt sensor 45, to the parking place management server 1. Further, the vehicle information provision unit 41*d* may provide the information indicating that all doors of the automated driving vehicle 4 are locked, based on the detection result of the door sensor 46, to the parking place management server 1. The vehicle information provision unit 41*d* may provide the vehicle body information such as the vehicle type, vehicle length, vehicle width and turning radius of the automated driving vehicle 4, to the parking place management server 1.

The vehicle control unit 41*e* executes the automated driving of the automated driving vehicle 4. In the automated driving, the automated driving vehicle 4 automatically travels along the target route in the instruction from the parking place management server 1. For example, the vehicle control unit 41*e* generates a trajectory of the automated driving vehicle 4, based on the target route, the position of the automated driving vehicle 4, the external environment of the automated driving vehicle 4, and the traveling state of the automated driving vehicle 4. The trajectory corresponds to a traveling plan for the automated driving. The trajectory includes a path along which the vehicle travels in the automated driving and a vehicle speed plan in the automated driving.

The path is a track along which the vehicle in the automated driving is scheduled to travel on the target route. For example, the path may be data (steering angle plan) about change in the steering angle of the automated driving vehicle 4 depending on the position on the target route. For example, the position on the target route is a set perpendicular position that is set at a predetermined interval (for example, 1 m) in the running direction of the target route. The steering angle plan is data associated with a target steering angle for each set perpendicular position.

For example, the vehicle control unit 41*e* generates the trajectory so as to run at the center on the traveling pathway in the parking place along the target route. In the case where an instruction about an upper limit vehicle speed is performed from the parking place management server 1, the vehicle control unit 41*e* generates the trajectory so as to obtain a vehicle speed plan in which the vehicle speed does not exceed the upper limit vehicle speed. The vehicle control unit 41*e* may generate the trajectory using the parking place map information acquired by the communication with the parking place management server 1.

In the case where the vehicle control unit 41*e* receives the wake-up instruction from the vehicle instruction unit 36 of the vehicle management server 2 and where the verification ECU 49 makes the determination of the coincidence of the authentication information, the vehicle control unit 41*e* starts up the engine of the automated driving vehicle 4 in which the engine has been stopped. The vehicle control unit 41*e* gives notice of the completion of the wake-up, to the vehicle management server 2. In the case where the vehicle control unit 41*e* fails in the wake-up, the vehicle control unit 41*e* gives notice of an error code, to the vehicle management server 2.

Similarly, in the case where the vehicle control unit 41*e* receives the shut-down instruction from the vehicle instruction unit 36 of the vehicle management server 2 and where the verification ECU 49 makes the determination of the coincidence of the authentication information, the vehicle control unit 41*e* stops the engine of the automated driving vehicle 4 in which the engine is being driven. The vehicle control unit 41*e* gives notice of the completion of the shut-down, to the vehicle management server 2. In the case where the vehicle control unit 41*e* fails in the shut-down, the vehicle control unit 41*e* gives notice of an error code, to the vehicle management server 2. An example of the configuration of the automated driving vehicle 4 has been described above. The configuration of the automated driving vehicle 4 is not limited to the above content as long as the configuration can realize the automated valet parking.

Processes of Automated Parking System

Processes of the automated parking system according to the embodiment will be described below with reference to the drawings. FIG. 6A is a flowchart showing an example of an authentication code generation process. For example, the authentication code generation process is executed when the automated valet parking is being provided in the parking place.

As shown in FIG. 6A, in S10, the vehicle determination unit 21 of the parking place management server 1 of the automated parking system 100 determines whether the reservation object vehicle 4 is in the parking place vicinity area D. For example, the vehicle determination unit 21 determines whether the automated driving vehicle corresponding to the reservation vehicle information is in the preset parking place vicinity area D, based on the position information transmitted from the reservation object vehicle 4.

In the case where it is determined that the reservation object vehicle 4 is in the parking place vicinity area D (S10: YES), the parking place management server 1 transitions to S12. In the case where it is not determined that the reservation object vehicle 4 is in the parking place vicinity area D (S10: NO), the parking place management server 1 ends this process. Thereafter, the parking place management server 1 repeats the determination in S10 again after a certain time elapses.

In S12, the hour determination unit 22 of the parking place management server 1 determines whether the current hour is equal to or later than the generation start hour. The generation start hour is an hour that is earlier than the scheduled entering hour in the entering reservation by the preset generation setting time. In the case where it is determined that the current hour is equal to or later than the generation start hour (S12: YES), the parking place management server 1 transitions to S14. In the case where it is not determined that the current hour is equal to or later than the generation start hour (S12: NO), the parking place management server 1 ends this process. Thereafter, the parking place management server 1 repeats the determination process in S10 again after a certain time elapses.

In S14, the authentication code request unit 23 of the parking place management server 1 requests the vehicle management server 2 to generate the authentication code. The authentication code request unit 23 transmits the entering reservation specifying information in association with the request for the generation of the authentication code.

In S16, the authentication code generation unit 31 of the vehicle management server 2 generates the authentication code. The authentication code generation unit 31 specifies the entering reservation based on the entering reservation specifying information received together with the request for the generation of the authentication code, and generates the authentication code corresponding to the specified entering reservation. Thereafter, the vehicle management server 2 ends this process.

FIG. 6B is a flowchart showing an example of an authentication code transmission process. The authentication code transmission process is executed, for example, when the authentication code is generated.

As shown in FIG. 6B, in S20, the vehicle determination unit 21 of the parking place management server 1 of the automated parking system 100 determines whether the reservation object vehicle 4 is in the parking place object area R. For example, the vehicle determination unit 21 determines whether the reservation object vehicle is in the preset parking place object area R, based on the detection information of the parking place sensor 12 provided in the parking place and the reservation vehicle information or based on the position information transmitted from the reservation object vehicle 4.

In the case where it is determined that the reservation object vehicle 4 is in the parking place object area R (S20: YES), the parking place management server 1 transitions to S22. In the case where it is not determined that the reservation object vehicle 4 is in the parking place object area R (S20: NO), the parking place management server 1 ends this process. Thereafter, the parking place management server 1 repeats the determination in S20 again after a certain time elapses.

In S22, the hour determination unit 22 of the parking place management server 1 determines whether the current hour is equal to or later than the transmission start hour. The transmission start hour is an hour that is earlier than the scheduled entering hour in the entering reservation by the preset transmission setting time. The transmission start hour may be an hour equal to the generation start hour, or may be an hour later than the generation start hour.

In the case where it is determined that the current hour is equal to or later than the transmission start hour (S22: YES), the parking place management server 1 transitions to S24. In the case where it is not determined that the current hour is equal to or later than the transmission start hour (S22: NO), the parking place management server 1 ends this process. Thereafter, the parking place management server 1 repeats the determination process in S20 again after a certain time elapses.

In S24, the authentication code request unit 23 of the parking place management server 1 requests the vehicle management server 2 to transmit the authentication code. The authentication code request unit 23 transmits the entering reservation specifying information in association with the request for the transmission of the authentication code.

In S26, the user request acceptance unit 32 of the vehicle management server 2 determines whether the user request acceptance unit 32 has accepted the authentication code request from the user terminal 3 of the reservation user or the in-vehicle device of the reservation object vehicle 4. The user request acceptance unit 32 accepts the authentication code request, for example, when the user terminal 3 of the reservation user or the in-vehicle device 40 of the reservation object vehicle 4 accesses the vehicle management server 2 and a particular operation is performed.

In the case where it is determined that the authentication code request has been accepted (S26: YES), the vehicle management server 2 transitions to S28. In the case where it is not determined that the authentication code request has been accepted (S26: NO), the vehicle management server 2 repeats the process in S26 until it is determined that the authentication code request has been accepted. In the case where the authentication code request is not accepted even after a certain time elapses, the vehicle management server 2 may give notice that the authentication code request has not been input, to the user terminal 3 or the in-vehicle device 40. In the case where the authentication code request is not accepted even after a certain time elapses from the notification, the vehicle management server 2 may give notice of an error to the parking place management server 1, and may end this process.

In S28, the authentication code transmission unit 33 of the vehicle management server 2 transmits the authentication code. For example, the vehicle management server 2 transmits the authentication code to a device that is of the user terminal 3 and the in-vehicle device and from which the authentication code request has been performed. Thereafter, the vehicle management server 2 ends this process.

Figure 7:
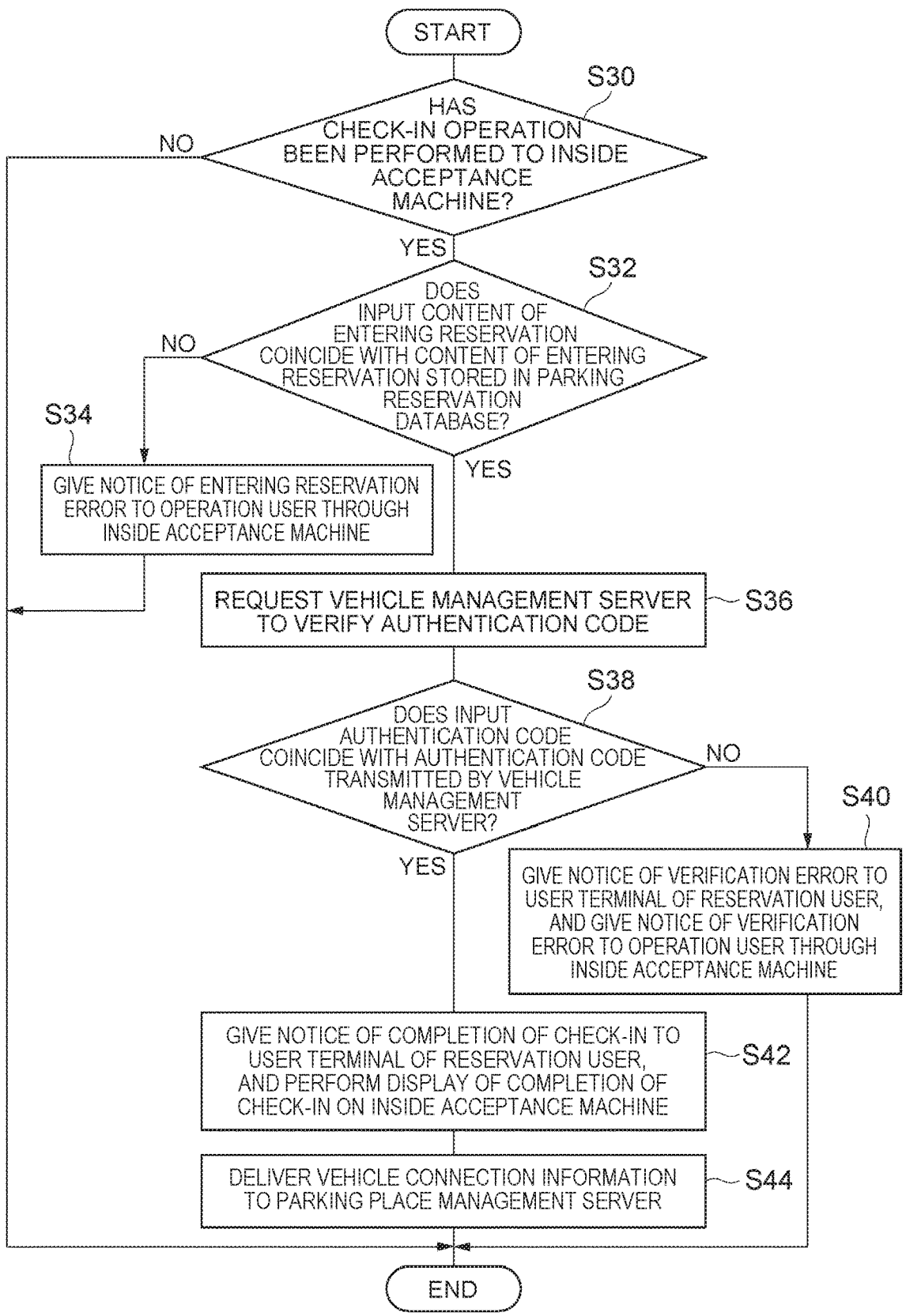
FIG. 7 is a flowchart showing an example of a check-in process.

FIG. 7 is a flowchart showing an example of a check-in process. The check-in process is executed, for example, when the authentication code to be used for the check-in is transmitted.

As shown in FIG. 7, in S30, the check-in processing unit 24 of the parking place management server 1 determines whether the check-in operation has been performed to the check-in acceptance machine 13a (inside acceptance machine 13). The check-in processing unit 24 determines that the check-in operation has been performed, for example, in the case where the operation user has logged in the check-in acceptance machine 13a and has input the content of the entering reservation and the authentication code.

In S32, the check-in processing unit 24 of the parking place management server 1 verifies the content of the entering reservation. The check-in processing unit 24 determines whether the input content of the entering reservation coincides with the content of the entering reservation stored in the parking reservation database 11. In the case where it is determined that the input content of the entering reservation coincides with the content of the stored entering reservation (S32: YES), the parking place management server 1 transitions to S36. In the case where it is not determined that the input content of the entering reservation coincides with the content of the stored entering reservation (S32: NO), the parking place management server 1 transitions to S34.

In S34, the check-in processing unit 24 of the parking place management server 1 gives notice of the entering reservation error through the check-in acceptance machine 13a. For example, the check-in processing unit 24 gives notice of the entering reservation error to the operation user, by performing the error display on the check-in acceptance machine 13a. Thereafter, the parking place management server 1 ends this process.

In S36, the check-in processing unit 24 of the parking place management server 1 requests the vehicle management server 2 to verify the authentication code. The parking place management server 1 transmits the input authentication code to the vehicle management server 2, in association with the entering reservation specifying information.

In S38, the verification unit 34 of the vehicle management server 2 determines (verifies) whether the authentication code input by the operation user coincides with the authentication code transmitted by the vehicle management server 2. The verification unit 34 specifies the entering reservation stored in the vehicle management parking reservation database 14, based on the entering reservation specifying information associated with the authentication code, and recognizes the authentication code corresponding to the entering reservation (the authentication code transmitted to the reservation user of the entering reservation). The verification unit 34 performs the verification between the input authentication code and the transmitted authentication code.

In the case where it is determined that the authentication code input by the operation user coincides with the authentication code transmitted by the vehicle management server 2 (S38: YES), the vehicle management server 2 transitions to S42. In the case where it is not determined that the authentication code input by the operation user coincides with the authentication code transmitted by the vehicle management server 2 (S38: NO), the vehicle management server 2 transitions to S40.

In S40, the user notification unit 35 of the vehicle management server 2 gives notice of the verification error to the user terminal 3 of the reservation user, and gives notice of the verification error to the operation user, by performing the error display on the check-in acceptance machine 13a through the parking place management server 1. Thereafter, the vehicle management server 2 ends this process.

In S42, the user notification unit 35 of the vehicle management server 2 gives notice of the completion of the check-in, to the user terminal 3 of the reservation user, and performs the display of the completion of the check-in on the check-in acceptance machine 13a.

In S44, the verification unit 34 of the vehicle management server 2 delivers (transmits) the vehicle connection information about the reservation object vehicle 4, to the parking place management server 1. The verification unit 34 registers the parking place management server 1 as the server that has the vehicle operation authority for the reservation object vehicle 4. Thereafter, the vehicle management server 2 ends this process.

Figure 8A:
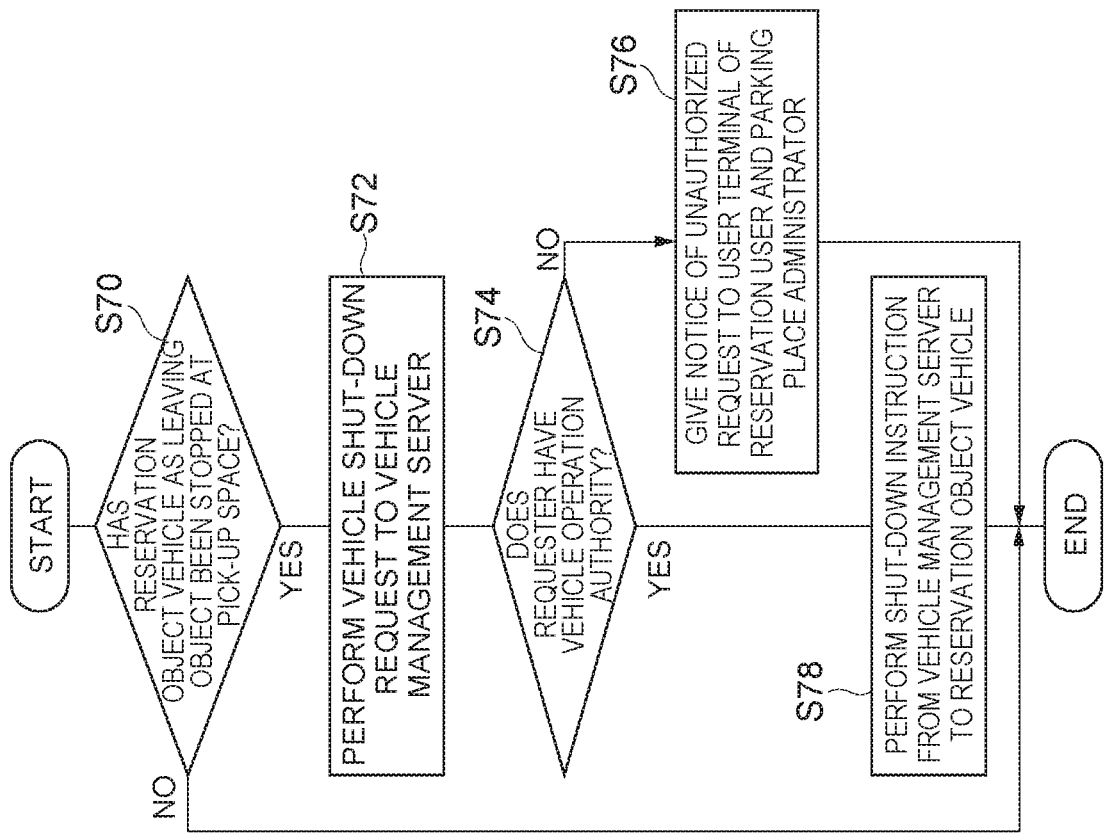
FIG. 8A is a flowchart showing an example of a wake-up process.

FIG. 8A is a flowchart showing an example of a wake-up process. The wake-up process is executed when the vehicle connection information about the reservation object vehicle 4 is delivered to the parking place management server 1.

As shown in FIG. 8A, in S50, the start condition determination unit 25 of the parking place management server 1 acquires the vehicle information about the reservation object vehicle 4. The start condition determination unit 25 obtains the vehicle information about the reservation object vehicle 4, by the provision from the vehicle information provision unit 41d of the reservation object vehicle 4.

In S52, the start condition determination unit 25 of the parking place management server 1 determines whether the start condition for the automated valet parking is satisfied. The start condition determination unit 25 determines whether the reservation object vehicle 4 satisfies the start condition such as the condition that the engine has been stopped, based on the detection information of the parking place sensor 12 and the vehicle information.

In the case where it is determined that the start condition for the automated valet parking is satisfied (S52: YES), the parking place management server 1 transitions to S54. In the case where it is not determined that the start condition for the automated valet parking is satisfied (S52: NO), the parking place management server 1 ends this process, and repeats the process in S50 again after a certain time elapses. In the case where the vehicle condition is not satisfied due to the vehicle abnormality or the like or in the case where the start condition is not satisfied even after a certain time elapses, the start condition determination unit 25 may give notice to the user terminal 3 of the reservation user and the parking place administrator.

In S54, the vehicle start-up request unit 26 of the parking place management server 1 performs the vehicle wake-up request to the vehicle management server 2. The vehicle start-up request unit 26 gives notice that the parking place management server 1 has the vehicle operation authority, to the vehicle management server 2, together with the vehicle wake-up request.

In S56, the vehicle instruction unit 36 of the vehicle management server 2 determines whether the requester of the vehicle wake-up request has the vehicle operation authority. In the case where the parking place management server 1 is registered as the server that has the vehicle operation authority for the reservation object vehicle 4, the vehicle instruction unit 36 determines that the requester has the vehicle operation authority. In the case where it is determined that the requester has the vehicle operation authority (S56: YES), the vehicle management server 2 transitions to S60. In the case where it is not determined that the requester has the vehicle operation authority (S56: NO), the vehicle management server 2 transition to S58.

In S58, the vehicle management server 2 gives notice that the unauthorized request has been performed, to the user terminal 3 of the reservation user of the reservation object vehicle 4 and the parking place administrator.

In S60, the vehicle instruction unit 36 of the vehicle management server 2 performs the wake-up instruction to the reservation object vehicle 4. The wake-up instruction is provided with the authentication information by which the vehicle authenticates that the wake-up instruction is an instruction from the vehicle management server 2. In the case where the verification of the authentication information about the wake-up instruction is successful, the engine is started up in the reservation object vehicle 4, in response to the wake-up instruction.

Figure 8B:
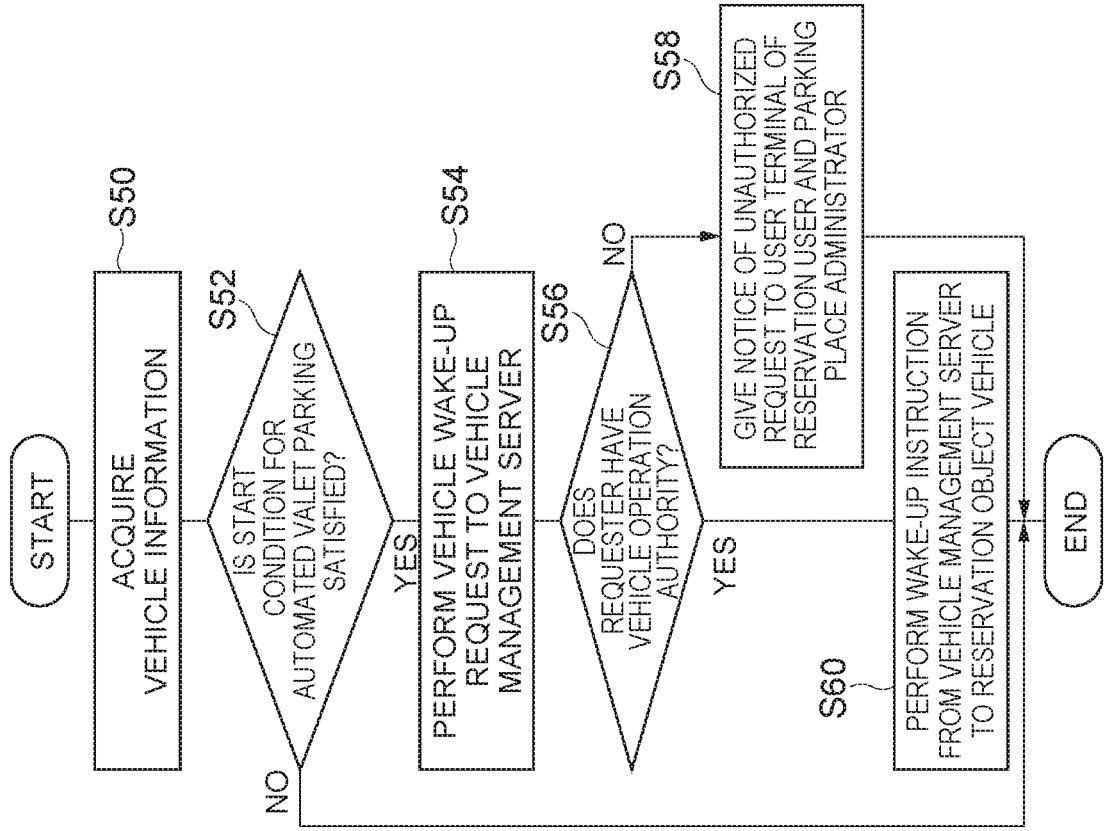
FIG. 8B is a flowchart showing an example of a shutdown process.

FIG. 8B is a flowchart showing an example of a shut-down process. The shut-down process is executed when the leaving of the reservation object vehicle 4 is performed by the automated valet parking.

As shown in FIG. 8B, in S70, the pick-up position arrival determination unit 27 of the parking place management server 1 determines whether the reservation object vehicle 4 that is the leaving object has arrived at the pick-up space 63 in the pick-up area 53. For example, the pick-up position arrival determination unit 27 determines that the reservation object vehicle 4 has arrived at the pick-up space 63, based on the detection result of the parking place sensor 12 (for example, the photographed image of the monitoring camera 12a).

In the case where it is determined that the reservation object vehicle 4 has arrived at the pick-up space 63 (S70: YES), the parking place management server 1 transitions to S72. In the case where it is not determined that the reservation object vehicle 4 has arrived at the pick-up space 63 (S70: NO), the parking place management server 1 ends this process.

In S72, the vehicle stop request unit 28 of the parking place management server 1 performs the vehicle shut-down request to the vehicle management server 2. The vehicle start-up request unit 26 gives notice that the parking place management server 1 has the vehicle operation authority, to the vehicle management server 2, together with the vehicle shut-down request.

In S74, the vehicle instruction unit 36 of the parking place management server 1 determines whether the requester of the vehicle shut-down request has the vehicle operation authority. In the case where the parking place management server 1 is registered as the server that has the vehicle operation authority for the reservation object vehicle 4, the vehicle instruction unit 36 determines that the requester has the vehicle operation authority. In the case where it is determined that the requester has the vehicle operation authority (S74: YES), the vehicle management server 2 transitions to S78. In the case where it is not determined that the requester has the vehicle operation authority (S74: NO), the vehicle management server 2 transitions to S76.

In S76, the vehicle management server 2 gives notice that the unauthorized request has been performed, to the user terminal 3 of the reservation user of the reservation object vehicle 4 and the parking place administrator.

In S78, the vehicle instruction unit 36 of the vehicle management server 2 performs the shut-down instruction to the reservation object vehicle 4. The shut-down instruction is provided with the authentication information by which the vehicle authenticates that the shut-down instruction is an instruction from the vehicle management server 2. In the case where the verification of the authentication information about the shut-down instruction is successful, the engine is stopped in the reservation object vehicle 4, in response to the shut-down instruction.

Figure 9:
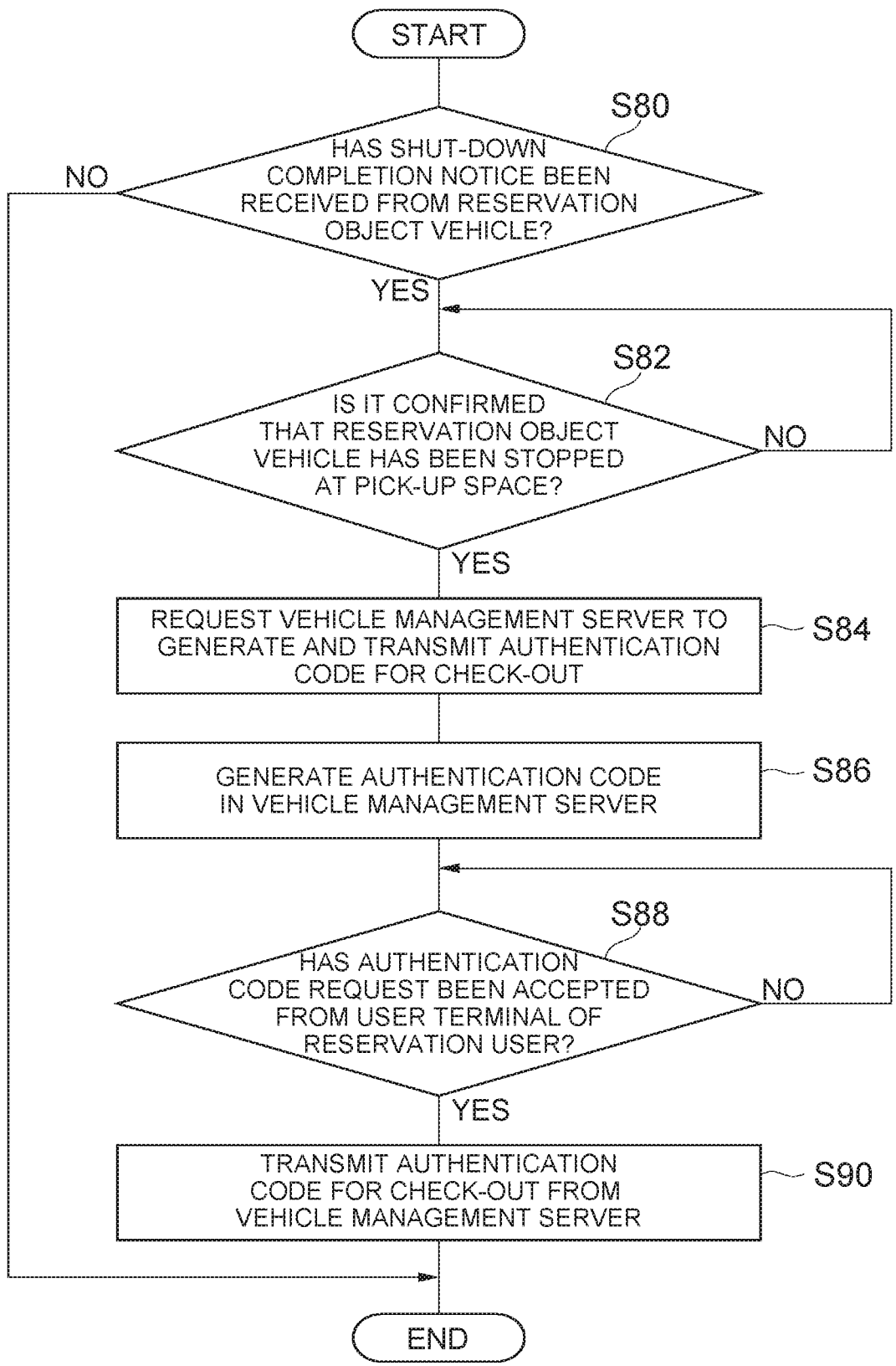
FIG. 9 is a flowchart showing an example of an authentication code transmission process for a check-out.

FIG. 9 is a flowchart showing an example of an authentication code transmission process for the check-out. The authentication code transmission process for the check-out is executed when the shut-down process in FIG. 8B is performed.

As shown in FIG. 9, the vehicle stop request unit 28 of the parking place management server 1 determines whether the vehicle stop request unit 28 has received the shut-down completion notice for the reservation object vehicle 4. For example, the parking place management server 1 receives the shut-down completion notice for the reservation object vehicle 4 through the vehicle management server 2. In the case where it is determined that the shut-down completion notice has been received (S80: YES), the parking place management server 1 transitions to S82. In the case where it is not determined that the shut-down completion notice has been received (S80: NO), the parking place management server 1 ends this process, and repeats the determination in S80 again after a certain time elapses.

In S82, the vehicle stop request unit 28 of the parking place management server 1 confirms that the reservation object vehicle 4 has been stopped at the pick-up space 63. The vehicle stop request unit 28 confirms that the reservation object vehicle 4 has been stopped at the pick-up space 63, based on the detection result of the parking place sensor 12. In the case where it is confirmed that the reservation object vehicle 4 has been stopped at the pick-up space 63 (S82: YES), the parking place management server 1 transitions to S84. In the case where it is not confirmed that the reservation object vehicle 4 has been stopped at the pick-up space 63 (S82: NO), the parking place management server 1 repeats the confirmation. In the case where it is not confirmed that the reservation object vehicle 4 has been stopped at the pick-up space 63 even after a certain time elapses, the vehicle stop request unit 28 may give notice to parking place administrator.

In S84, the authentication code request unit 23 of the parking place management server 1 requests the vehicle management server 2 to generate and transmit the authentication code for the check-out. The authentication code request unit 23 transmits the entering reservation specifying information in association with the request for the generation and transmission of the authentication code.

In S86, the authentication code generation unit 31 of the vehicle management server 2 generates the authentication code for the check-out.

In S88, the user request acceptance unit 32 of the vehicle management server 2 determines whether the user request acceptance unit 32 has accepted the authentication code request for the check-out from the user terminal 3 of the reservation user. The user request acceptance unit 32 accepts the authentication code request for the check-out, for example, when the user terminal 3 of the reservation user or the in-vehicle device 40 of the reservation object vehicle 4 accesses the vehicle management server 2 and a particular operation is performed.

In the case where it is determined that the authentication code request for the check-out has been accepted (S88: YES), the vehicle management server 2 transition to S90. In the case where it is not determined that the authentication code request for the check-out has been accepted (S88: NO), the vehicle management server 2 repeats the process in S88 until it is determined that the authentication code request for the check-out has been accepted. In the case where the authentication code request is not accepted even after a certain time elapses, the vehicle management server 2 may give notice that the authentication code request has not been input, to the user terminal 3 or the in-vehicle device 40. In the case where the authentication code request is not accepted even after a certain time elapses from the notification, the vehicle management server 2 may give notice of an error to the parking place management server 1, and may end this process.

In S90, the authentication code transmission unit 33 of the vehicle management server 2 transmits the authentication code for the check-out. For example, the authentication code transmission unit 33 transmits the authentication code to a device that is of the user terminal 3 and the in-vehicle device and from which the authentication code request for the check-out has been performed.

Figure 10:
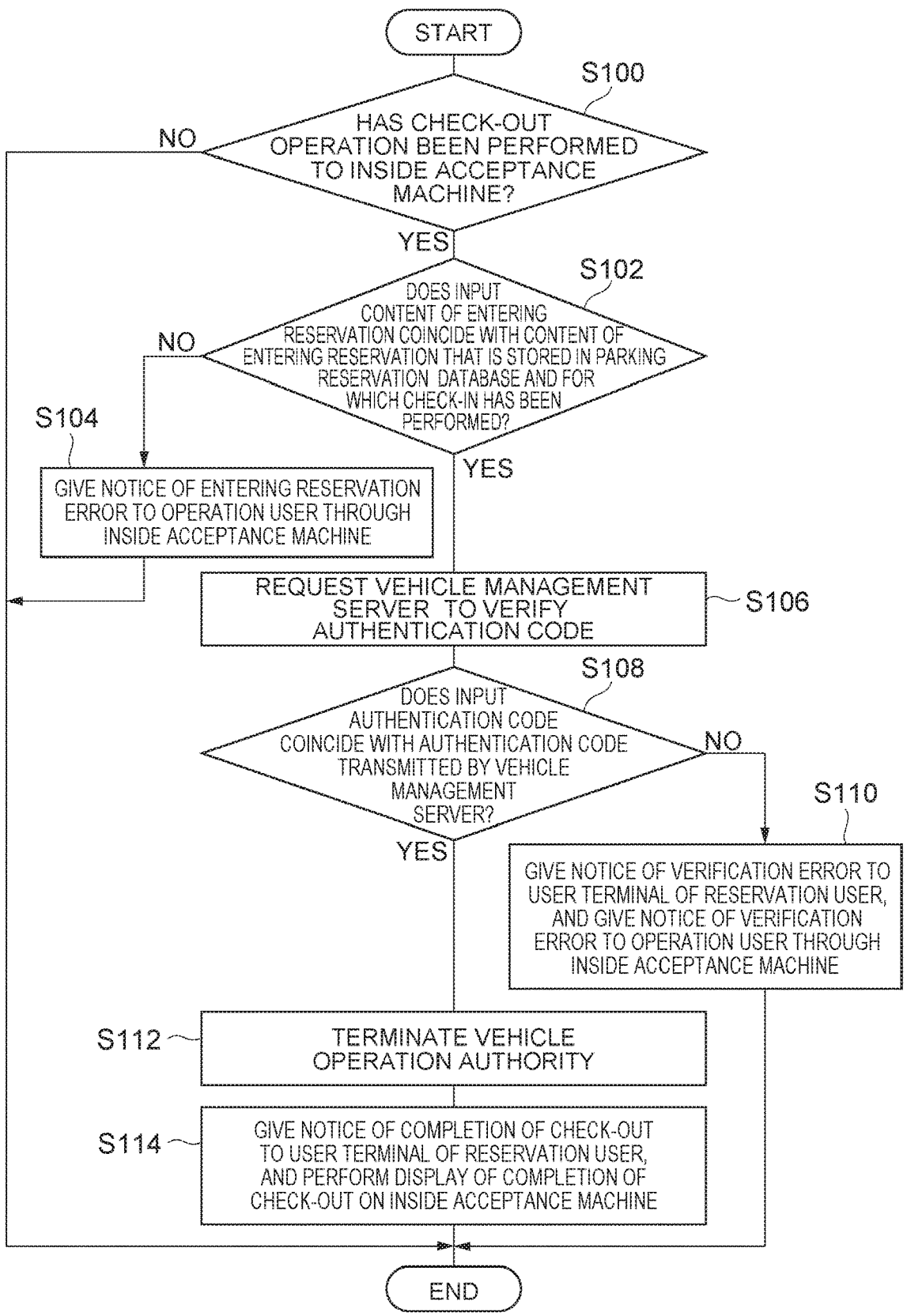
FIG. 10 is a flowchart showing an example of a check-out process.

FIG. 10 is a flowchart showing an example of a check-out process. The check-out process is executed, for example, when the authentication code for the check-out is transmitted.

As shown in FIG. 10, in S100, the check-out processing unit 29 of the parking place management server 1 determines whether the check-out operation has been performed to the check-out acceptance machine 13b (inside acceptance machine 13). The check-out processing unit 29 determines that the check-out operation has been performed, for example, when the operation user has logged in the check-out acceptance machine 13b and has input the content of the entering reservation and the authentication code.

In S102, the check-out processing unit 29 of the parking place management server 1 verifies the content of the entering reservation. The check-out processing unit 29 determines whether the input content of the entering reservation coincides with the content of the entering reservation stored in the parking reservation database 11. In the case where it is determined that the input content of the entering reservation coincides with the content of the stored entering reservation (S102; YES), the parking place management server 1 transitions to S106. In the case where it is not determined that the input content of the entering reservation coincides with the content of the stored entering reservation (S102; NO), the parking place management server 1 transitions to S104.

In S104, the check-out processing unit 29 of the parking place management server 1 gives notice of the entering reservation error through the check-out acceptance machine 13b. For example, the check-out processing unit 29 gives notice of the entering reservation error to the operation user, by performing the error display on the check-out acceptance machine 13b. Thereafter, the parking place management server 1 ends this process.

In S106, the check-out processing unit 29 of the parking place management server 1 requests the vehicle management server 2 to verify the authentication code. The parking place management server 1 transmits the input authentication code for the check-out, to the vehicle management server 2, in association with the entering reservation specifying information.

In S108, the verification unit 34 of the vehicle management server 2 determines (verifies) whether the authentication code for the check-out input by the operation user coincides with the authentication code transmitted by the vehicle management server 2. The verification unit 34 specifies the entering reservation stored in the vehicle management parking reservation database 14, based on the entering reservation specifying information associated with the authentication code, and recognizes the authentication code corresponding to the entering reservation (the authentication code transmitted to the reservation user of the entering reservation). The verification unit 34 performs the verification between the input authentication code for the check-out and the transmitted authentication code.

In the case where it is determined that the authentication code input by the operation user coincides with the authentication code transmitted by the vehicle management server 2 (S108: YES), the vehicle management server 2 transitions to S112. In the case where it is not determined that the authentication code input by the operation user coincides with the authentication code transmitted by the vehicle management server 2 (S108: NO), the vehicle management server 2 transitions to S110.

In S110, the user notification unit 35 of the vehicle management server 2 gives notice of the verification error to the user terminal 3 of the reservation user, and gives notice of the verification error to the operation user, by performing the error display on the check-out acceptance machine 13b through the parking place management server 1. Thereafter, the vehicle management server 2 ends this process.

In S112, the verification unit 34 of the vehicle management server 2 terminates the grant of the vehicle operation authority for the reservation object vehicle 4 to the parking place management server 1. For example, the verification unit 34 eliminates the parking place management server 1 from servers that have the vehicle operation authority for the reservation object vehicle 4.

In S114, the user notification unit 35 of the vehicle management server 2 gives notice of the completion of the check-out, to the user terminal 3 of the reservation user, and performs the display of the completion of the check-out on the check-out acceptance machine 13b.

With the automated parking system 100 (the parking place management server 1 and the vehicle management server 2) according to the embodiment described above, the authentication code (the authentication code that is used for the check-in) is transmitted in the case where it is determined that the reservation object vehicle 4 is in the parking place object area R and where the current hour is equal to or later than the transmission start hour that is earlier than the scheduled entering hour by the transmission setting time. Therefore, it is possible to avoid the authentication code from being transmitted at a timing when the reservation object vehicle 4 is distant from the parking place or a timing that is excessively earlier than the scheduled entering hour, and to enhance the security relevant to the transmission of the authentication code, compared to a case where the relation of the position of the reservation object vehicle 4, the current hour and the scheduled entering hour is not considered.

Further, with the automated parking system 100, the authentication code is generated in the case where it is determined that the reservation object vehicle 4 is in the parking place vicinity area D that extends to the outside of the entrance of the parking place 50 compared to the parking place object area R and where the current hour is equal to or later than the generation start hour that is earlier than the scheduled entering hour by the generation setting time. Therefore, while enhancing the security in consideration of the relation of the position of the reservation object vehicle 4, the current hour and the scheduled entering hour, it is possible to generate and prepare the authentication code before the condition for the transmission of the authentication code is satisfied, and it is possible to distribute computation load on the vehicle management server 2 compared to a case where the generation and the transmission are concurrently performed.

Furthermore, with the automated parking system 100, the authentication code is transmitted after the acceptance of the authentication code request from the user terminal 3 or the in-vehicle device 40 of the reservation object vehicle 4. Therefore, it is possible to shorten a time from the transmission of the authentication code to the check-in using the authentication code, and to contribute to the enhancement of the security relevant to the authentication code, compared to a case where the authentication code is transmitted before user's preparation is completed.

Further, with the automated parking system 100, roles are divided and shared by the parking place management server 1 that manages the parking place and the vehicle management server 2 that manages the automated driving vehicle. Thereby, it is possible to perform security measures corresponding the respective roles, and there is an advantage in the enhancement of the security relevant to the authentication code.

The embodiment of the disclosure has been described above, but the disclosure is not limited to the above-described embodiment. In addition to the above-described embodiment, the disclosure can be carried out in various modes in which a variety of modifications and improvements are performed based on the knowledge of a person skilled in the art.

The automated parking system 100 does not always need to be constituted by the two servers: the parking place management server 1 and the vehicle management server 2. The automated parking system 100 may be constituted by one server that has the function of the parking place management server 1 and the function (the function relevant to the automated valet parking) of the vehicle management server 2. Further, the automated parking system 100 may be constituted by three or more serves.

It is not always necessary that the automated parking system 100 can transmit the authentication code to both the user terminal 3 and the in-vehicle device 40 of the reservation object vehicle 4. The automated parking system 100 may be configured to transmit the authentication code only to the user terminal 3. Further, the automated parking system 100 may be capable of accepting the authentication code request only from the user terminal 3.

In the automated parking system 100, the condition for the generation of the authentication code and the condition for the transmission of the authentication code do not always need to be different conditions. The automated parking system 100 may use the detection information of the parking place sensor 12, in the condition for the generation of the authentication code. The authentication code request unit 23 of the parking place management server 1 may perform the request for the generation and transmission of the authentication code, in the case where the vehicle determination unit 21 determines that the reservation object vehicle 4 is in the parking place object area R and where the hour determination unit 22 determines that the current hour is equal to or later than the transmission start hour. In this case, in the vehicle management server 2, the authentication code generation unit 31 generates the authentication code, and thereafter, when the user request acceptance unit 32 has accepted the authentication code request, the authentication code transmission unit 33 transmits the authentication code. In the case where the user request acceptance unit 32 of the vehicle management server 2 has accepted the authentication code request in advance, the generation and transmission of the authentication code may be performed as a single process.

With the above-described automated parking system 100, the authentication code is generated in the case where it is determined that the reservation object vehicle 4 is in the parking place object area R and where the current hour is equal to or later than the transmission start hour that is earlier than the scheduled entering hour by the transmission setting time. Therefore, it is possible to avoid the authentication code from being generated at the timing when the reservation object vehicle 4 is distant from the parking place or the timing that is excessively earlier than the scheduled entering hour, compared to the case where the relation of the position of the reservation object vehicle 4, the current hour and the scheduled entering hour is not considered. Accordingly, with the automated parking system 100 in this case, it is possible to shorten a time during which the authentication code exists, and therefore, it is possible to enhance the security relevant to the authentication code.

The automated parking system 100 may perform the request for the generation and transmission of the authentication code, in the case where the vehicle determination unit 21 determines that the reservation object vehicle 4 is in the parking place vicinity area D and where the hour determination unit 22 determines that the current hour is equal to or later than the generation start hour.

The automated parking system 100 does not always need to generate the authentication code each time. The automated parking system 100 may be configured to have stock of many authentication codes that are previously generated, and to select an authentication code to be used from the stock (for example, to randomly select an authentication code). In this case, the automated parking system 100 does not need to include the authentication code generation unit 31, and does not need to determine the condition for the generation of the authentication code.

In the automated parking system 100, the acceptance of the authentication code request by the user request acceptance unit 32 is not always necessary in the transmission of the authentication code. Even when the authentication code request is not performed by the reservation user, the automated parking system 100 may transmit the authentication code in the case where the vehicle determination unit 21 determines that the reservation object vehicle 4 is in the parking place object area R and where the hour determination unit 22 determines that the current hour is equal to or later than the transmission start hour. With the automated parking system 100 in this case, the reservation user automatically receives the authentication code, when the reservation object vehicle 4 enters the parking place object area R or when the current hour becomes equal to or later than the transmission start hour, and therefore it is possible to enhance convenience for the reservation user. After receiving the authentication code, the user terminal 3 gives notice to the reservation user by both sound and vibration, for informing the reservation user of the reception of the authentication code. The in-vehicle device 40 gives notice of the reception of the authentication code, to the reservation user, by a screen display indicating the reception of the authentication code and a sound output from the speaker.

The automated parking system 100 may be configured to include a part of the user terminal 3 or the in-vehicle device 40, and the user terminal 3 or the in-vehicle device 40 may execute some functions as a kind of server. For example, in the automated parking system 100, the same hour determination as that by the hour determination unit 22 may be performed by an automated valet parking function installed in the user terminal 3 or the in-vehicle device 40. In this case, the user terminal 3 or the in-vehicle device 40 may allow the authentication code request of the reservation user to be transmitted, when it is determined that the current hour is equal to or later than the transmission start hour that is set on the basis of the scheduled entering hour. Thereby, it is possible to avoid the reservation user from performing the authentication code request excessively early, and it is possible to restrain the reservation user from missing the notice of the reception of the authentication code. Even in this case, the hour determination unit 22 of the parking place management server 1 may perform the hour determination, for double check.

Similarly, in the automated parking system 100, for example, the determination of the position of the reservation object vehicle 4 may be performed by an automated valet parking function installed in the in-vehicle device 40. Information about the parking place object area R is given to the in-vehicle device 40. The in-vehicle device 40 may allow the authentication code request of the reservation user to be transmitted, when it is determined that the reservation object vehicle is in the parking place object area R based on the position information about the reservation object vehicle 4. Thereby, it is possible to avoid the reservation user from performing the authentication code request excessively early, and to restrain the reservation user from missing the notice of the reception of the authentication code. Even in this case, the vehicle determination unit 21 of the parking place management server 1 may perform the determination of the position of the reservation object vehicle 4, for double check.

What is claimed is:

1. An automated parking system comprising a server configured to start an instruction of an automated valet parking for an automated driving vehicle of a reservation user in a parking place, when the server transmits an authentication code to the reservation user of an entering reservation including a scheduled entering hour and reservation vehicle information after accepting the entering reservation, and a check-in using the authentication code is performed in the parking place after transmission of the authentication code, the server including:
a vehicle determination unit configured to determine whether a reservation object vehicle is in a parking place object area preset based on detection information of a parking place sensor provided in the parking place and the reservation vehicle information, or based on position information that is transmitted from the reservation object vehicle, the reservation object vehicle being the automated driving vehicle that corresponds to the reservation vehicle information;
an hour determination unit configured to determine whether a current hour is equal to or later than a transmission start hour, the transmission start hour being earlier than a preset transmission setting time based on the scheduled entering hour; and
an authentication code transmission unit configured to transmit the authentication code to a user terminal of the reservation user or an in-vehicle device of the reservation object vehicle, when the vehicle determination unit determines that the reservation object vehicle is in the parking place object area and the hour determination unit determines that the current hour is equal to or later than the transmission start hour.

2. The automated parking system according to claim 1, wherein the server includes an authentication code generation unit configured to generate the authentication code, when the vehicle determination unit determines that the reservation object vehicle is in the parking place object area and the hour determination unit determines that the current hour is equal to or later than the transmission start hour.

3. The automated parking system according to claim 1, wherein:
   the server includes an authentication code generation unit configured to generate the authentication code;
   the vehicle determination unit is configured to determine whether the reservation object vehicle is in a parking place vicinity area preset based on the position information that is transmitted from the reservation object vehicle;
   the hour determination unit is configured to determine whether the current hour is equal to or later than a generation start hour, the generation start hour being earlier than a preset generation setting time based on the scheduled entering hour;
   the authentication code generation unit is configured to generate the authentication code, when the vehicle determination unit determines that the reservation object vehicle is in the parking place vicinity area and the hour determination unit determines that the current hour is equal to or later than the generation start hour;
   the parking place vicinity area is an area that extends to an outside of an entrance of the parking place compared to the parking place object area; and
   the generation start hour is an hour equal to the transmission start hour or an hour earlier than the transmission start hour.

4. The automated parking system according to claim 1, wherein:
   the server includes a user request acceptance unit configured to accept an authentication code request from the user terminal or the in-vehicle device; and
   the authentication code transmission unit is configured to transmit the authentication code after the user request acceptance unit accepts the authentication code request, when the vehicle determination unit determines that the reservation object vehicle is in the parking place object area and the hour determination unit determines that the current hour is equal to or later than the transmission start hour.

5. The automated parking system according to claim 1, wherein:
   the server is a parking place management server configured to manage the parking place and a vehicle management server configured to manage the automated driving vehicle;
   the parking place management server includes the vehicle determination unit and the hour determination unit; and
   the vehicle management server includes the authentication code transmission unit.

6. A server comprising:
   a vehicle determination unit;
   an hour determination unit; and
   an authentication code transmission unit, wherein:
   the server is configured to start an instruction of an automated valet parking for an automated driving vehicle of a reservation user in a parking place, when the server transmits an authentication code to the reservation user of an entering reservation including a scheduled entering hour and reservation vehicle information after accepting the entering reservation, and a check-in using the authentication code is performed in the parking place after transmission of the authentication code;
   the vehicle determination unit is configured to determine whether a reservation object vehicle is in a parking place object area preset based on detection information of a parking place sensor provided in the parking place and the reservation vehicle information, or based on position information that is transmitted from the reservation object vehicle, the reservation object vehicle being the automated driving vehicle that corresponds to the reservation vehicle information;
   the hour determination unit is configured to determine whether a current hour is equal to or later than a transmission start hour, the transmission start hour being earlier than a preset transmission setting time based on the scheduled entering hour; and
   the authentication code transmission unit is configured to transmit the authentication code to a user terminal of the reservation user or an in-vehicle device of the reservation object vehicle, when the vehicle determination unit determines that the reservation object vehicle is in the parking place object area and the hour determination unit determines that the current hour is equal to or later than the transmission start hour.

\* \* \* \* \*